United States Patent
Wilhelmsson et al.

(10) Patent No.: US 8,811,241 B2
(45) Date of Patent: Aug. 19, 2014

(54) COEXISTENCE OF PLURAL WIRELESS COMMUNICATION TRANSCEIVERS IN CLOSE PROXIMITY

(75) Inventors: Leif Wilhelmsson, Dalby (SE); Erik Carlberg, Bjärred (SE); Sven Mattisson, Bj ärred (SE); Hans Stattin, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 870 days.

(21) Appl. No.: 12/773,097

(22) Filed: May 4, 2010

(65) Prior Publication Data

US 2011/0116490 A1  May 19, 2011

Related U.S. Application Data

(60) Provisional application No. 61/261,777, filed on Nov. 17, 2009.

(51) Int. Cl.
*H04J 1/00* (2006.01)
(52) U.S. Cl.
USPC ........... 370/281; 370/290; 370/343; 370/488; 370/497; 375/240.11
(58) Field of Classification Search
None
See application file for complete search history.

(56) References Cited

U.S. PATENT DOCUMENTS

| | | | |
|---|---|---|---|
| 4,272,743 A * | 6/1981 | Evans | ........................... 333/176 |
| 6,580,924 B1 | 6/2003 | Lu et al. | |
| 7,230,510 B2 | 6/2007 | Lobeek | |
| 7,333,446 B2 | 2/2008 | Sointula | |

(Continued)

FOREIGN PATENT DOCUMENTS

| | | | |
|---|---|---|---|
| EP | 1 494 490 A1 | | 1/2005 |
| EP | 1494490 A1 | * | 1/2005 |
| EP | 1 659 814 A1 | | 5/2006 |
| EP | 1659814 A1 | * | 5/2006 |

OTHER PUBLICATIONS

English Translation of EP1659814 B1.*

(Continued)

*Primary Examiner* — Andrew Chriss
*Assistant Examiner* — Salvador E Rivas
(74) *Attorney, Agent, or Firm* — Leffler Intellectual Property Law, PLLC; Kenneth B. Leffler

(57) ABSTRACT

A communication device has a controller operatively connected to at least a first transceiver and a second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border. Coexistence between the first and second transceivers is achieved by adjusting receive and/or transmit filters associated with the transceivers to create a guard band that is located more in the first frequency band if the second transceiver is using frequencies close to its adjacent border, and a guard band that is more in the second frequency band if the second transceiver is not using frequencies close to its adjacent border.

20 Claims, 18 Drawing Sheets

(56) References Cited

U.S. PATENT DOCUMENTS

| | | |
|---|---|---|
| 2004/0038693 A1 | 2/2004 | Niwano |
| 2005/0058230 A1* | 3/2005 | Thomas et al. ............... 375/347 |
| 2007/0082622 A1 | 4/2007 | Leinonen et al. |
| 2007/0110198 A1 | 5/2007 | Skarby et al. |
| 2007/0232349 A1 | 10/2007 | Jones et al. |
| 2007/0253466 A1 | 11/2007 | Jones et al. |
| 2008/0070586 A1 | 3/2008 | Kermoal et al. |
| 2009/0061780 A1* | 3/2009 | Sekiya et al. ............... 455/63.1 |
| 2009/0262785 A1 | 10/2009 | Wilhelmsson |
| 2009/0286501 A1 | 11/2009 | Rousu et al. |

OTHER PUBLICATIONS

PCT International Search Report, mailed Jun. 30, 2011, in connection with International Application No. PCT/EP2010/067523.

PCT Written Opinion, mailed Jun. 30, 2011, in connection with International Application No. PCT/EP2010/067523.

Xiang Chen et al. "Coexistence Analysis Involving 3GPP Long Term Evolution" Vehicular Technology Conference, 2007. Sep. 1, 2007 IEEE 66th, IEEE, PI, 225-229, XP031147399, ISBN: 978-1-4244-0263-2.

EP Article 94(3) Communication EPC, dated Feb. 9, 2013, in connection with European Patent Application No. 10 784282.5-1505.

* cited by examiner

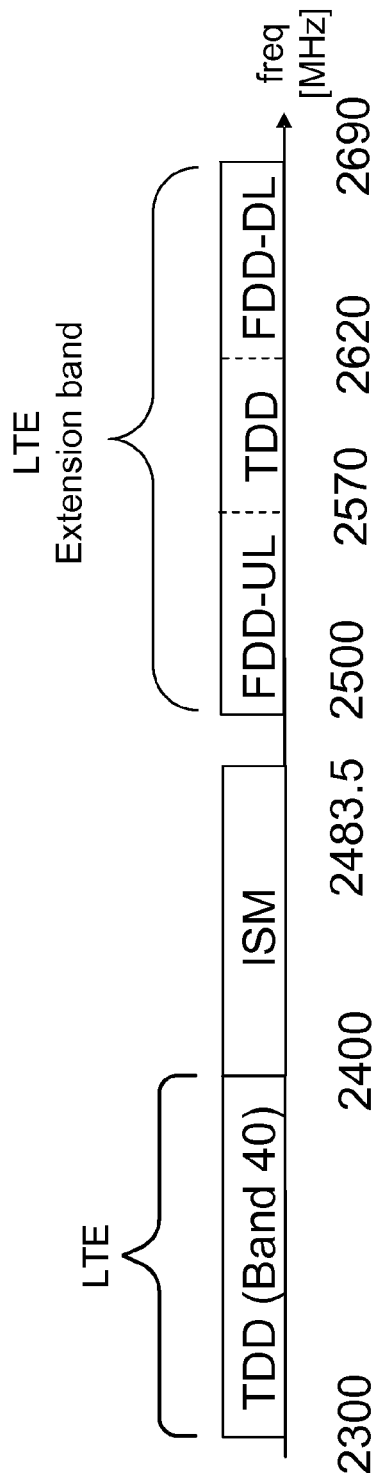
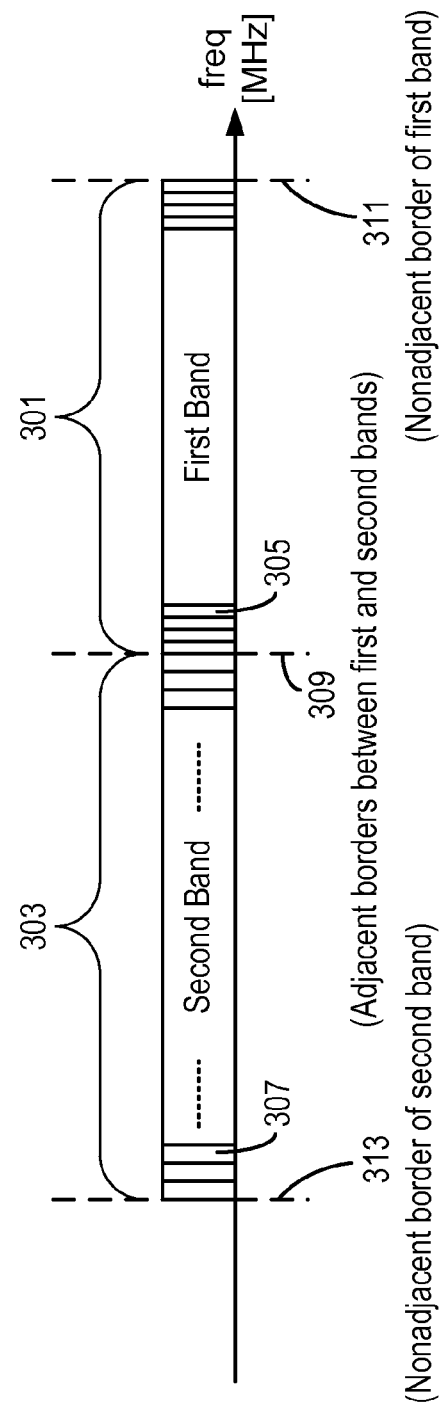
FIG. 3a
FIG. 3b

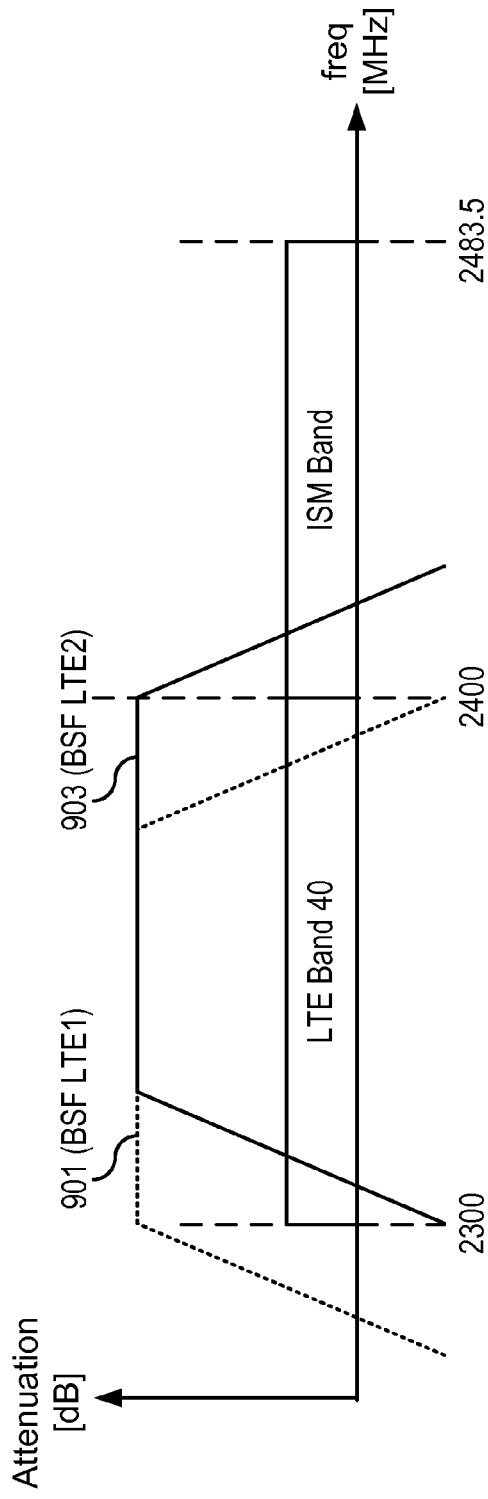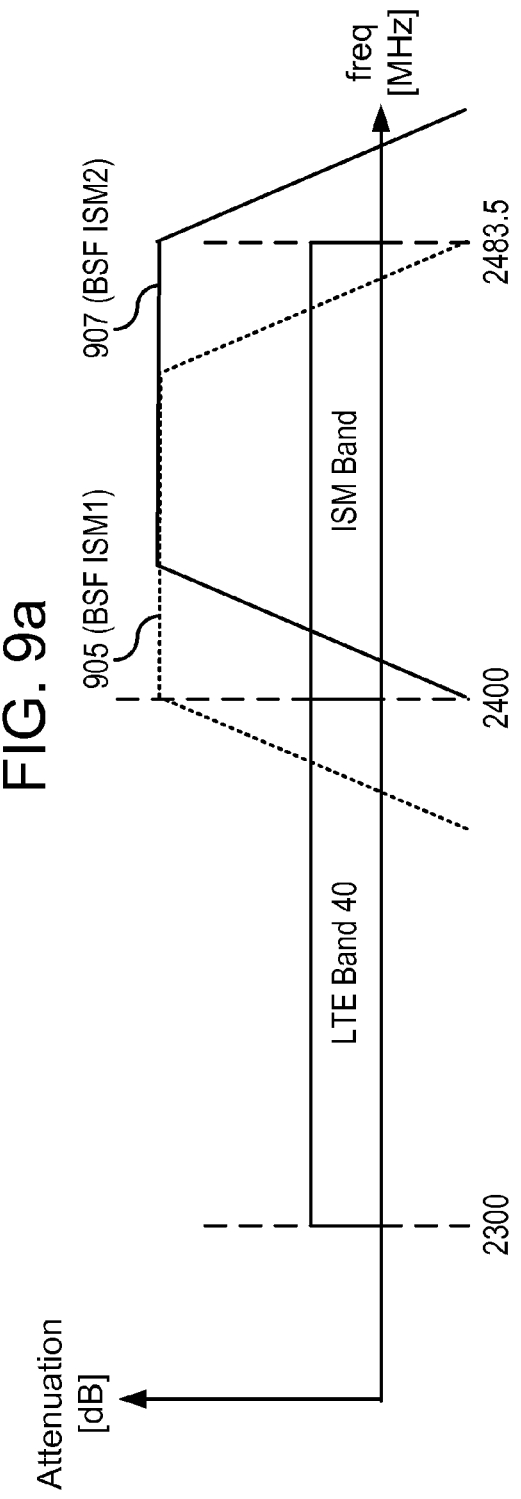

COEXISTENCE OF PLURAL WIRELESS COMMUNICATION TRANSCEIVERS IN CLOSE PROXIMITY

CROSS REFERENCE TO RELATED APPLICATIONS

This application claims the benefit of U.S. Provisional Application No. 61/261,777, filed Nov. 17, 2009, which is hereby incorporated herein by reference in its entirety.

BACKGROUND

The present invention relates to wireless telecommunication systems, and more particularly to methods and apparatuses that enable multiple radio systems to operate in close proximity using adjacent frequency bands.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11a and 802.11g standards and the Bluetooth® standards have been increasingly deployed in the 2.4-2.4835 GHz band. Moreover, new communications systems are being worked on, such as the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:

Incumbent non-communications: Power unintentionally radiated by equipment, for example microwave ovens, will be a source of disturbance.

Incumbent communications: Intended radiation by other communication systems like for example WLAN, Bluetooth®, or Radio Frequency-Identification (RF-ID) will also be experienced as disturbance when no coordination is applied.

Future systems: Systems that do not exist yet but which will be built in the future can cause severe disturbances. The only known factors are the restrictions imposed upon these systems by the regulations. However, as discussed before, regulations are changing over time, making predictions rather unreliable.

Coexistence can be handled in a number of different ways, as will now be discussed.

One way of enabling coexistence is by arranging for the different systems to use time division multiplexing (TDM). One aspect of coexistence by means of time division is that it usually requires some kind of collaboration between the systems. For instance, if it is known by one system that another system is receiving, the former might delay its transmission so as not to interfere with the latter. Alternatively, if the latter system knows that reception occurred while the former was transmitting, then it might choose not to use the probably corrupted information and instead to rely on powerful coding and time interleaving and/or possibly retransmission mechanisms as alternative ways of obtaining the information. Because at least one of the systems typically will be affected in a negative way, the overall data rate transmitted will be lower than if a solution permitting simultaneous operation had been feasible.

Another way of enabling coexistence is by means of frequency division multiplexing (FDM), which is an arrangement in which the different systems use different frequencies. Such arrangements allow for the several systems to operate concurrently, so the operation of one does not interrupt operation of another. However, in order to allow for a coexistence solution based on frequency division, a guard band (i.e., a portion of the radio spectrum that is not used by either of the systems) is needed between the two systems to allow for feasible filters to attenuate the signals. Concerning the required attenuation, there are two things that must be considered. One of these is that the filter must ensure that the out-of-band (OOB) emissions of one system are sufficiently low enough to avoid causing an unacceptable degradation of the other system's ability to receive signals. A second consideration is that the filter must ensure that the receiver front-end is not saturated.

Presently, the Industrial, Scientific and Medical (ISM) band at 2.4-2.4835 GHz is used both by Bluetooth® technology and by WLAN technology (i.e., operating in accordance with IEEE standards 802.11b and/or 802.11g). All combinations of these incompatible technologies can be found in mobile phones and similar devices, and the percentage of phones that will have both Bluetooth® and WLAN technology built into them will increase in the future. The bands used for the cellular standards, like the Global System for Mobile Communication (GSM) and Wideband Code Division Multiple Access (WCDMA) are today located several hundred MHz away from the ISM band, and ensuring co-existence between for instance Bluetooth® technology and the cellular standards has been easily achieved by means of filtering. However, with the introduction of technology built in accordance with the Worldwide Interoperability for Microwave Access (WiMAX) and 3GPP Long Term Evolution (LTE) standards, which might be used in the 2.3-2.4 GHz band, filtering might not be sufficient to ensure coexistence because there is no guard band between these systems' radio spectrum and the ISM band. (As used herein, the term "guard band" is used in the conventional sense to mean an unused portion of radio spectrum between two frequency bands.) Both WiMAX and LTE are supposed to use time division duplexing (TDD) in the 2.3-2.4 GHz band, which is denoted "band 40" within 3GPP. In a TDD arrangement, bidirectional communication is achieved by, at times, using one or more frequencies for transmission and, at other times, using the same frequencies for reception.

As these various communication devices become smaller, the number of transceivers in different devices like mobile phones, personal digital assistants (PDAs), laptop computers, and the like is increasing. This means that co-existence between different systems is an issue that can be expected to become even more pronounced in the future.

Therefore, it is desirable to have methods and apparatuses that enable various radio communication systems to coexist with one another in an efficient way that seeks to maximize quality of performance while minimizing any wasting of system resources.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a communication device having a controller operatively connected to a plurality of transceivers including a first transceiver and a second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border. Such operation includes operating the first and second transceivers concurrently in a frequency division multiplexing mode of operation whereby interference at the first transceiver caused by transmissions of the second transceiver is mitigated, at least in part, by means of filtering. The controller detects which one or more channels of the second frequency band are being used by the second transceiver and based on an outcome of the detecting, performs the following: If any of the detected one or more channels of the second frequency band are adjacent the first frequency band, then one or more of a transmit filter of the second transceiver and a receive filter of the first transceiver are adjusted to create a first guard band that is located more in the first frequency band than in the second frequency band. However, if none of the detected one or more channels of the second frequency band are adjacent the first frequency band, then one or more of the transmit filter of the second transceiver and the receive filter of the first transceiver are adjusted to create a second guard band that is located more in the second frequency band than in the first frequency band.

In some embodiments, adjusting one or more of the transmit filter of the second transceiver and the receive filter of the first transceiver to create the first guard band that is located more in the first frequency band than in the second frequency band comprises adjusting the receive filter of the first transceiver such that a corner frequency of the receive filter is within the first frequency band at a first spectral distance from the adjacent border of the first frequency band.

In a further aspect, adjusting one or more of the transmit filter of the second transceiver and the receive filter of the first transceiver to create the second guard band that is located more in the second frequency band than in the first frequency band comprises, in some embodiments, adjusting the receive filter of the first transceiver such that the corner frequency of the receive filter is less than the first spectral distance from the adjacent from the adjacent border of the first frequency band.

In yet another aspect, adjusting one or more of the transmit filter of the second transceiver and the receive filter of the first transceiver to create the second guard band that is located more in the second frequency band than in the first frequency band comprises, in some embodiments, adjusting the transmit filter of the second transceiver such that a corner frequency of the transmit filter is within the second frequency band at a second spectral distance from the adjacent border of the first frequency band, wherein a spectral distance between the corner frequency of the transmit filter of the second transceiver and the corner frequency of the receive filter of the first transceiver is sufficient to create a guard band between the first and second frequency bands.

In some embodiments, adjusting the receive filter of the first transceiver such that the corner frequency of the receive filter is less than the first spectral distance from the adjacent from the adjacent border of the first frequency band comprises adjusting the receive filter of the first transceiver such that the corner frequency of the receive filter is located at the adjacent border of the first frequency band.

In another aspect of some embodiments, operation of the communication device includes, if any of the detected one or more channels of the second frequency band are adjacent the first frequency band, then the controller causing the first transceiver to operate in a way that avoids receiving channels located within the first guard band.

In some embodiments, the first and second frequency bands being adjacent one another means that an adjacent border of the first frequency band is within 20 MHz of an adjacent border of the second frequency band.

In an aspect of some embodiments, the receive filter is a band selective filter that has a pass band whose bandwidth is narrower than a bandwidth of the first frequency band, and wherein adjusting the receive filter comprises adjusting a frequency location of the receive filter pass band.

In some embodiments, the receive filter comprises a plurality of band selective filters and a switching arrangement. Each of the band selective filters passes a different portion of the first frequency band. The switching arrangement is operatively coupled to the plurality of band selective filters to enable only one of the band selective filters to be included within a receive path of the first transceiver.

Similarly, in some embodiments, the transmit filter comprises a plurality of band selective filters and a switching arrangement. Each of the band selective filters passes a different portion of the second frequency band. The switching arrangement is operatively coupled to the plurality of band selective filters to enable only one of the band selective filters to be included within a transmit path of the second transceiver.

In still other embodiments, methods and apparatuses are provided for operating a communication device having a controller operatively connected to a plurality of transceivers including a first transceiver and a second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border. Such operation includes operating the first and second transceivers concurrently in a frequency division multiplexing mode of operation whereby interference at the first transceiver caused by transmissions of the second transceiver is mitigated, at least in part, by means of filtering. The controller detects which one or more channels of the first frequency band are being used by the first transceiver and based on an outcome of the detecting, performs: If any of the detected one or more channels of the first frequency band are adjacent the second frequency band, then one or more of a transmit filter of the second transceiver and a receive filter of the first transceiver are adjusted to create a first guard band that is located more in the second frequency band than in the first frequency band. However, if none of the detected one or more channels of the first frequency band are adjacent the second frequency band, then one or more of the transmit filter of the second transceiver and the receive filter of the first transceiver are adjusted to create a second guard band that is located more in the first frequency band than in the second frequency band.

BRIEF DESCRIPTION OF THE DRAWINGS

The objects and advantages of the invention will be understood by reading the following detailed description in conjunction with the drawings in which:

FIG. 3a is a graph showing frequency allocations of ISM-compatible equipment and of LTE-compatible equipment.

FIG. 3b is a graph illustrating various features and terminology associated with adjacent frequency bands.

FIG. 9a illustrates exemplary filters that can be used in the embodiment of FIG. 8 when the transceiver is an LTE transceiver operating on Band 40.

FIG. 9b illustrates corresponding adjustable filter characteristics for the band selective filters when used in the ISM band.

DETAILED DESCRIPTION

Figure 1:
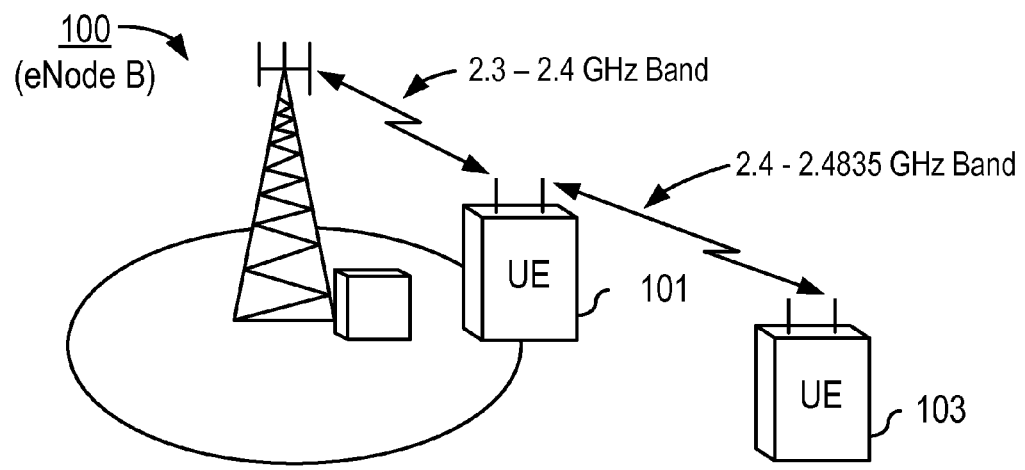
FIG. 1 is a block diagram illustrating coexistence problems that arise when a user equipment communicates with an eNode B of a cellular telecommunications system using one frequency band, and also communicates with a second user equipment using a second frequency band.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., any one or combination of analog and/or discrete digital logic gates interconnected to perform a specialized function; application specific integrated circuits; one or more interconnected gate arrays), by one or more programmed processors configured to execute a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

To more easily appreciate various aspects of the invention and understand its merits, the description involves several specific known communication standards. However, it should be understood that this is not intended to limit the scope of the invention in any way. To the contrary, the described techniques can equally well be used in connection with other communication standards. Moreover, generalization to more than the illustrated number of standards is also possible.

To further facilitate an understanding of various inventive aspects, the description is made for the case in which only two transceivers (each operating within a different communication system) are co-located within the same device and potentially interfere with one another. Techniques for applying the various inventive aspects to more than two transceivers (e.g., embodiments involving three adjacent frequency bands, one of which is located between the other two) will be readily apparent to those of ordinary skill in the art after reading this disclosure.

Moreover, to facilitate an understanding of the various aspects of the embodiments consistent with the invention, reference is made to the well-known LTE, Bluetooth®, and WLAN standards, and the terminology of these systems is used accordingly. However, the described methods and apparatuses are mere examples, and those of ordinary skill in the art will readily understand how to apply the various principles presented herein to other types of systems that pose similar coexistence problems, and generalizations to other frequency bands are straightforward.

FIG. 1 is a block diagram of an eNode B (base station) 100 of a cellular telecommunications system. In this example, the air interface of the cellular communications system operates in accordance with the Third Generation Partnership Project's (3GPP's) Long Term Evolution (LTE) standards, and communications take place in the 2.3-2.4 GHz band (i.e., "Band 40", which is operated in TDD mode so that these frequencies are used for both transmission and reception at one time or another). To illustrate coexistence situations, a first user equipment (UE) 101 is depicted that has first transceiver circuitry designed to operate in accordance with Bluetooth® standards, and these communications take place in the 2.4-2.4835 GHz ISM band. As is well-known, Bluetooth® technology utilizes adaptive frequency hopping spread spectrum techniques, which avoid using crowded frequencies in the hopping sequence, thereby improving resistance to radio frequency interference. In the illustrated example, the first user equipment 101 is engaged in Bluetooth®-compatible communications with a second user equipment 103 that is similarly equipped with Bluetooth®-compatible transceiver.

The first user equipment 101 also communicates with the eNode B 100. To enable these communications, the first user equipment 101 includes second transceiver circuitry designed to operate in accordance with any version/release of the LTE standard.

In the example illustrated in FIG. 1, the first transceiver's communications in the 2.4-2.4835 GHz band are subject to interference from the second transceiver's operation in the 2.3-2.4 GHz band, and (at least in some operating modes) vice versa. The co-location of the first and second transceivers within the same device (e.g., the first user equipment 101) makes this especially problematic.

As explained in the Background section, interference avoidance and/or mitigation by means of frequency division (filtering) is a preferred means for achieving coexistence because time division (scheduling) can substantially reduce the level of performance of one or both of the involved systems. However, when systems are operating so close in frequency that filtering is not an option, the existing means of ensuring coexistence is to resort to time division multiplexing.

Figure 2:
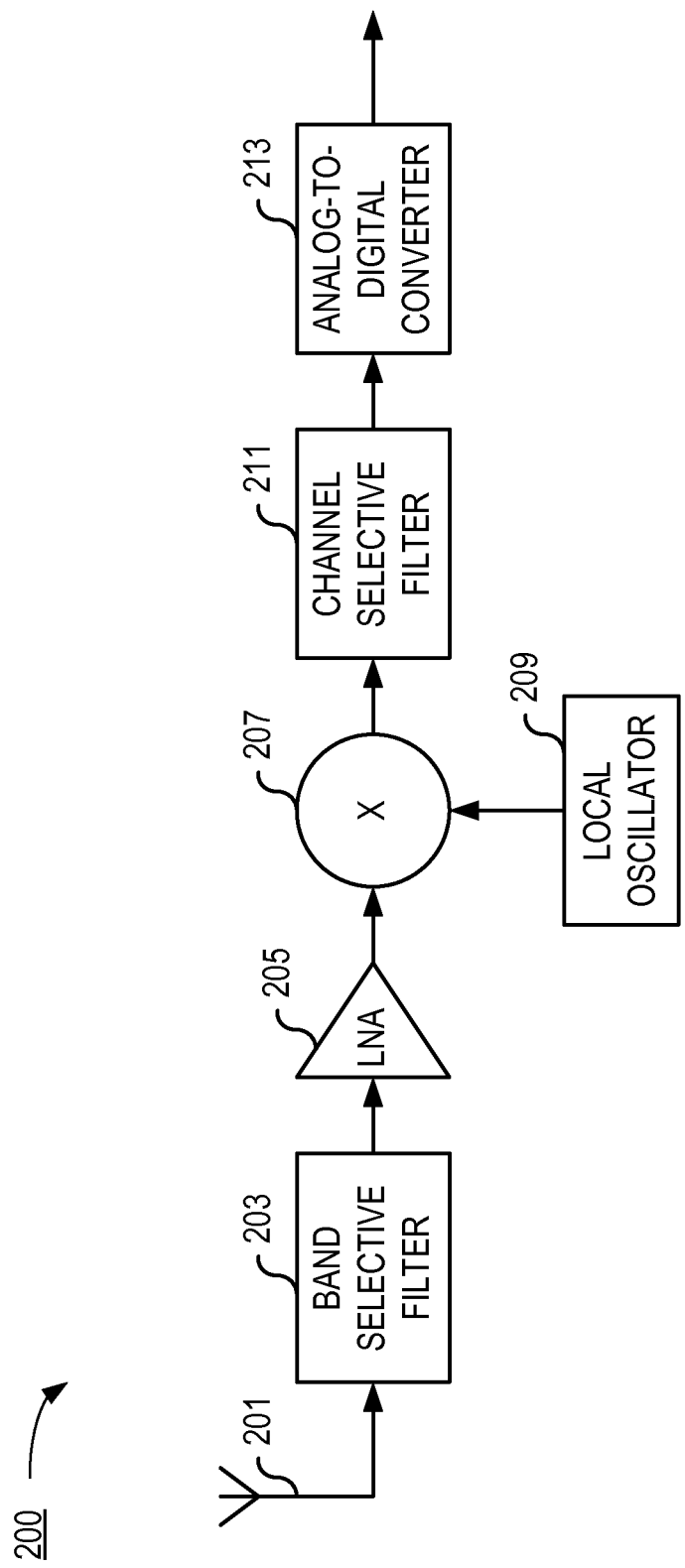
FIG. 2 is a block diagram of exemplary receiver circuitry that utilizes filtering to mitigate the effects of interference.

A receiver in a wireless communication system constitutes a number of different blocks, as illustrated in FIG. 2. In particular, FIG. 2 is a block diagram of exemplary receiver circuitry 200 that utilizes filtering to mitigate the effects of interference. The received signal is first passed from an antenna 201 through a band selective filter (BSF) 203. The band selective filter 203 can, for example, be a band pass filter (BPF) with a passband corresponding to the range in which the received signal can be located. Typically, this filter is used to filter out interference from other systems. Interfering signals from the same system will not be attenuated. For example, the band selective filter 203 of a Bluetooth® receiver, which operates in the ISM band, will remove interference that is outside of the ISM band, like cellular systems operating at for instance 1800 MHz. However, interference from, for instance, other Bluetooth® units or from WLAN units that are operating in the ISM band will not be suppressed. The bandwidth of the band selective filter 203 is typically on the order of 100 MHz. That is, the passband is on the order of 100 MHz. The bandwidth of the transition band might vary depending on what is needed. However, there is a limitation regarding how narrow the transition band can be made, and representative figures for what can be achieved are on the order of 20-40 MHz.

The filtered signal supplied at the output of the band selective filter 203 is typically amplified by a low noise amplifier (LNA) 205 and then down-converted from radio frequency (RF) into a baseband signal by a mixer 207 that receives, at one input, the RF signal from the low noise amplifier 205 and at another input, a matching RF signal supplied by a local oscillator 209. The baseband signal supplied at an output of the mixer 207 is passed through a channel selective filter (CSF) 211 having a bandwidth that corresponds to the bandwidth of the signal. So, in the Bluetooth® technology example in which the signal bandwidth is about 1 MHz, the channel selective filter 211 would also have a bandwidth of about 1 MHz. The signal supplied at the output of the channel selective filter 211 is then typically converted into a series of digital samples by an analog-to-digital converter 213, so that further processing can be performed in the digital domain.

Whereas the channel selective filter 211 is the key component when it comes to suppressing interference that has been transmitted in the same band, it is the band selective filter 203 that determines how well interference from systems in adjacent bands can be handled.

In case of strong interference from other systems, a major potential source of performance degradation is compression of the low noise amplifier 205 and the mixer 207. This is particularly a problem when the frequency of the interference is so close to the frequency of the desired signal that the band selective filter 203 only attenuates the interfering signal by a small amount.

As explained above in the Background section, there are two fundamentally different approaches for dealing with interference, namely, time division (scheduling) and frequency division (filtering). The problem with the former is that it reduces the available transmission time for at least one of the involved systems. The inventors of the subject matter described herein have recognized that the problem with the latter when two different transceivers are using adjacent frequency bands is that part of the available bandwidth is conventionally used as a guard interval, thereby wasting valuable resources for transmission.

To address these problems, various embodiments consistent with the invention make a frequency division (filtering) solution feasible by using dynamically changeable filters in order to adapt to actual interference conditions, and by that to extend the range in which a coexistence solution based on filtering can be used. This is, at least in part, achieved by adjusting where the guard band between the two adjacent bands (i.e., the bands used by the two different transceivers, respectively) is located, and thereby to create embodiments in which there is no requirement for a dedicated guard band.

These and other aspects will now be described in further detail. To facilitate the use of specific examples, FIG. 3a is a graph showing frequency allocations of ISM-compatible equipment and of LTE-compatible equipment. As can be seen in the figure, LTE TDD mode of operation is allocated to 2300-2400 MHz. The ISM band is allocated to 2400-2483.5 MHz. An LTE extension band then occupies 2500-2690 MHz, which is partitioned as follows: 2500-2570 MHz is used as uplink frequencies in LTE FDD mode; 2570-2620 MHz is used for LTE TDD mode; and 2620-2690 MHz is used as downlink frequencies in LTE FDD mode. In the following examples, the focus is on the LTE Band 40 and the ISM band, which are adjacent one another.

To further facilitate the description, the terminology used throughout this description adopts the following definitions, which are understood with reference to FIG. 3b, which illustrates two arbitrary frequency bands, denoted a first band 301 and a second band 303, that are adjacent one another. The first band 301 comprises a plurality of channels, of which the channel 305 is but one example. The second band 303 similarly comprises a plurality of channels, of which the channel 307 is but one example. As each band's channels span from a lowest frequency to a highest frequency, each band is considered herein to have two "borders", one at the band's lowest frequency and another at the band's highest frequency. To distinguish one from the other for any given band, the fact that the band is adjacent another band is used in the following terminology: An "adjacent border" is one that is shared by the two bands, such as the adjacent border 309, which marks where the first and second bands 301, 303 meet next to one another. Similarly, a "nonadjacent border" of a band is that border of a band that does not mark the meeting point with the other band. This is illustrated by the nonadjacent border 311 of the first band 301 and the nonadjacent border 313 of the second band 303.

It is useful here to point out that in the illustrations presented so far, "adjacent" bands abut one another without any frequency gap between them, whatsoever. However, as used herein (e.g., in the description as well as in the claims), the term "adjacent" is meant to include this situation and also other situations in which two bands are separated by some unused frequencies, but wherein the bandwidth of the unused frequencies is smaller than a filter transition bandwidth of the transceivers, so that this gap is not sufficient as a guard band in any practical embodiment. For example, using today's technology, a gap of 20 MHz or smaller between two bands would still result in those frequency bands being considered "adjacent" to one another.

Suppose that a first transceiver operates in accordance with Bluetooth® standards in the 2.4-2.4835 GHz ISM band, and that a second transceiver is simultaneously operating in accordance with LTE standards in the 2.3-2.4 GHz band (Band 40). The use of the LTE Band 40 means that the second transceiver is operating in TDD mode, so that the channels occupying this band can at times be used for transmission and at other times for reception.

Figure 4A:
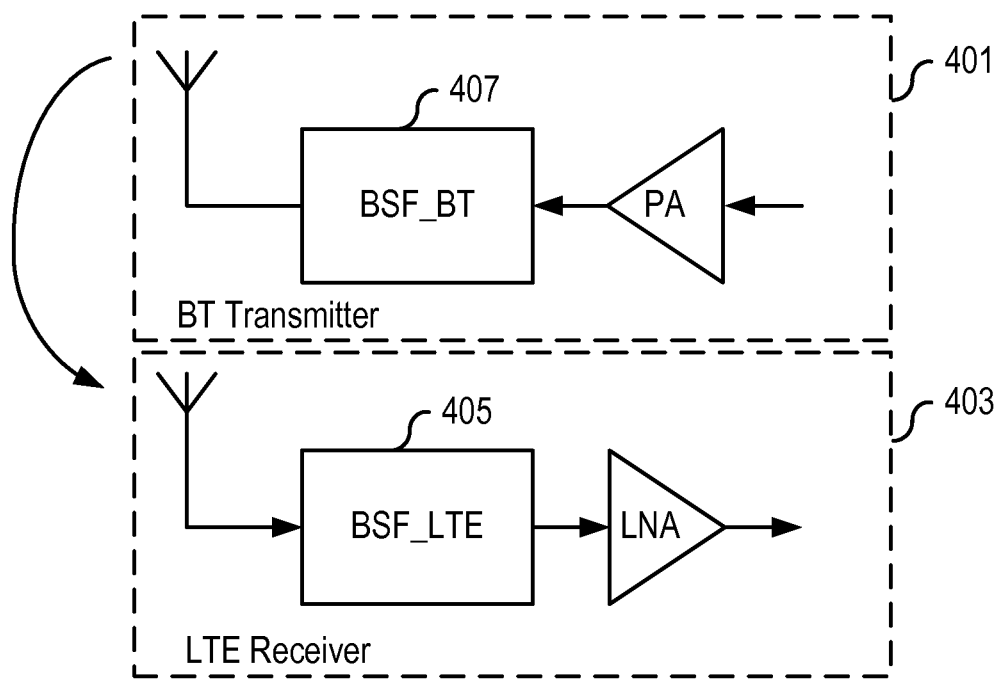
FIG. 4a illustrates the path by which transmissions from a Bluetooth® transmitter operating in the ISM band cause interference to an LTE receiver operating in Band 40.
Figure 4B:
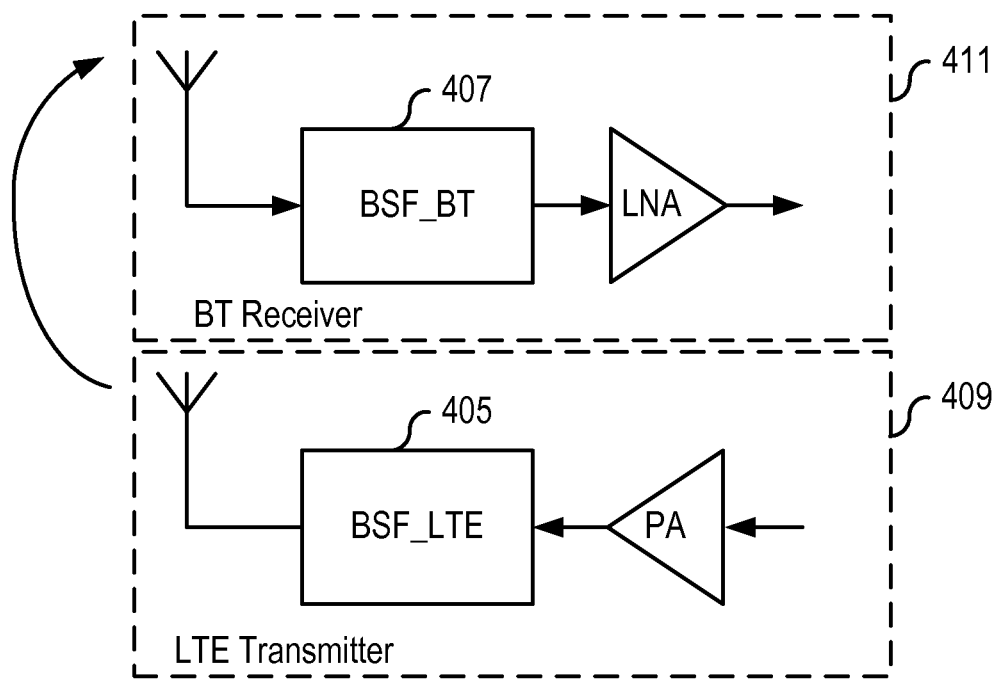
FIG. 4b illustrates the path by which transmissions from an LTE transmitter operating in Band 40 cause interference to a Bluetooth® receiver operating in the ISM band.

Moreover, suppose that the maximum output power from the LTE transmitter is +23 dBm and that the maximum output power from the Bluetooth transmitter is +10 dBm. Furthermore, suppose that the Bluetooth® receiver has a 1 dB compression point (CP) at −26 dBm, typically corresponding to an input referred third order intercept point (IIP3) at about −16 dBm, whereas the LTE receiver has a 1 dB CP at −16 dBm (i.e., 10 dB better than the Bluetooth® receiver). In addition, suppose that the antenna coupling between the LTE transceiver and the Bluetooth® transceiver is −10 dB (i.e., the power of the LTE signal is attenuated by 10 dB in the transfer from the LTE (transmit) antenna to the Bluetooth® receiver antenna). The antenna coupling is reciprocal, so that the same attenuation is experienced from the Bluetooth® transmitter to the LTE receiver. FIG. 4a illustrates the path by which transmissions from a Bluetooth® transmitter operating in the ISM band cause interference to an LTE receiver operating in Band 40, and FIG. 4b illustrates the path by which transmissions from an LTE transmitter operating in Band 40 cause interference to a Bluetooth® receiver operating in the ISM band.

It follows from the above-stated assumptions about transceiver characteristics that, in order for a signal from the Bluetooth® transmitter 401 not to enter the LTE receiver 403 at a higher power level than the 1 dB CP, the attenuation of the BSF 405 for the LTE receiver 403 must be at least 16 dB. In a similar way it can be seen that in order for a signal from the LTE transmitter 409 not to enter the Bluetooth® receiver 411 at a higher power level than the 1 dB CP, the attenuation needed for the BSF 407 in the Bluetooth® receiver 409 needs to be 39 dB.

The above numbers for filter attenuation ensure that neither of the two systems will be driven into compression. However, to ensure that the systems do not interfere with one another, it must also be verified that the OOB emissions from the two systems are at sufficiently low power levels. Suppose the OOB level for the Bluetooth® transmitter 401 is such that the above-described filter with 39 dB attenuation is sufficient to suppress the OOB emissions emanating from the Bluetooth® transmitter 401 from degrading the performance of the LTE receiver 403. For the LTE transmitter 409, suppose that the OOB power is so high that it must be attenuated by 30 dB in order to allow for acceptable Bluetooth® receiver performance. This means that the LTE band selective filter 405 is determined by the LTE transmitter's OOB emissions rather than by its own blocking requirements.

Figure 5:
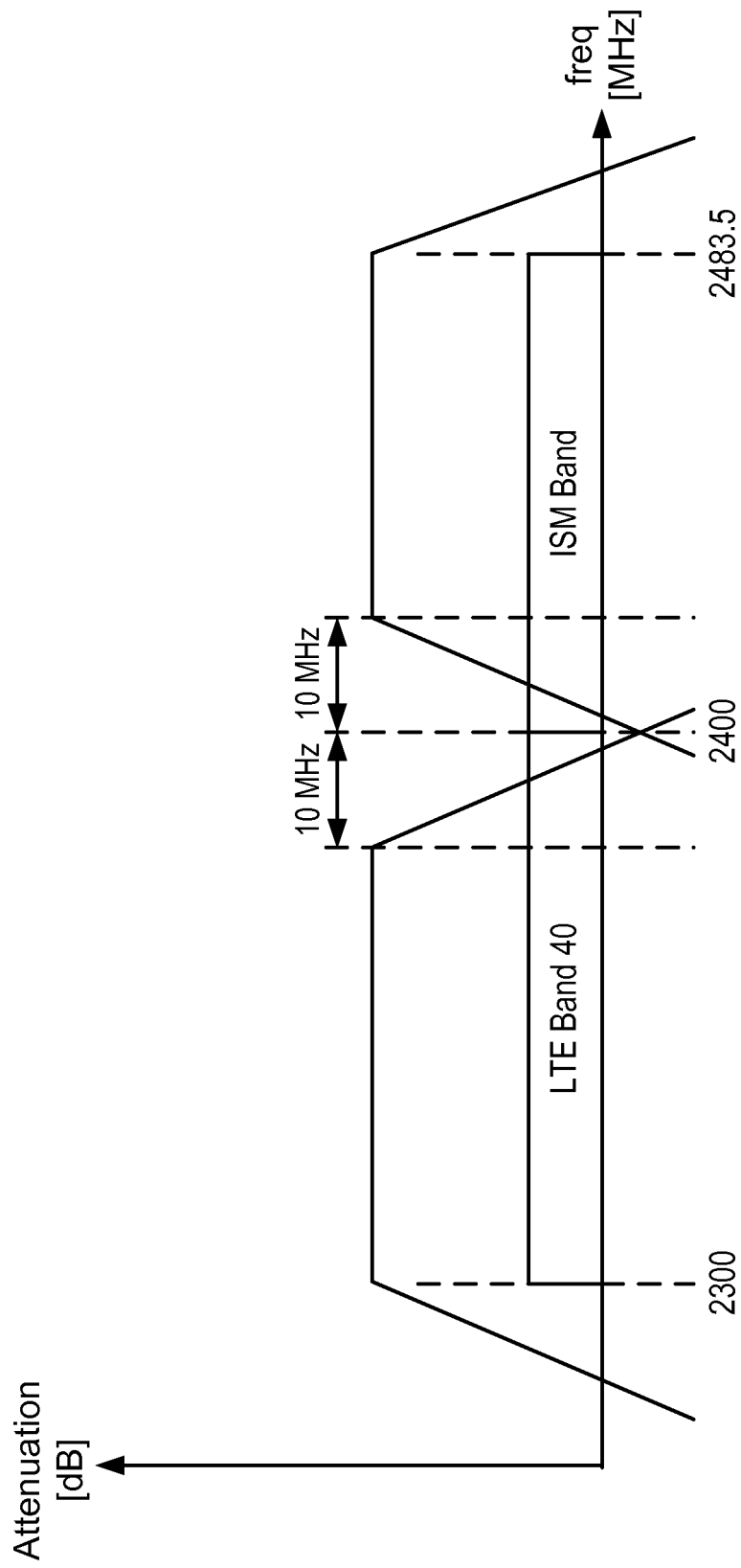
FIG. 5 illustrates how a guard band can be created in between Band 40 and the ISM band by simply not using the upper 10 MHz of Band 40 and the lowest 10 MHz of the ISM band (i.e., by not using 10 MHz of bandwidth on either side of the adjacent borders of the ISM band and Band 40).

In summary, the Bluetooth® filter 407 needs to attenuate its input signals by 39 dB whereas the LTE filter 405 needs to attenuate its input signals by 30 dB. To achieve attenuation in the range of 30-40 dB, a guard band of about 20 MHz is needed. FIG. 5 illustrates how a guard band can be created in between Band 40 and the ISM band by simply not using the upper 10 MHz of Band 40 and the lowest 10 MHz of the ISM band (i.e., by not using 10 MHz of bandwidth on either side of the adjacent borders of the ISM band and Band 40).

Figure 6:
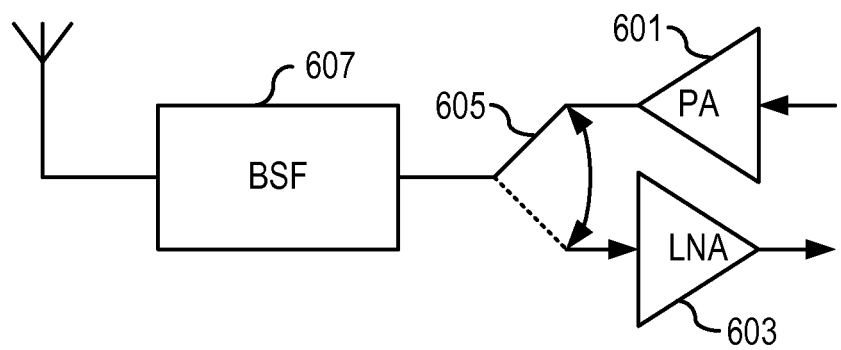
FIG. 6 is a block diagram of a front-end of a typical TDD transceiver.

Aspects of the problem will now be described in more detail with reference to FIG. 6, which is a block diagram of a front-end of a typical TDD transceiver. The front end comprises a power amplifier 601 in the transmit path, and a low noise amplifier 603 in the receive path. A switch 605 allows the power amplifier 601 and the low noise amplifier 603 to share a band selective filter 607. The output of the power amplifier 601 is connected to one port of the switch 605, and the input of the low noise amplifier 603 is connected to another port of the switch 605. A third, common port of the switch 605 is connected to the band selective filter 607. The switch 605 is operated such that, during transmission, the band selective filter 607 is connected to the transmit path (in the figure indicated by the power amplifier 601) and that, during reception, the band selective filter 607 is instead connected to the receive path (in the figure indicated by the low noise amplifier (LNA). (The band selective filter 607 is, in this example, operational in either direction).

Figure 7:
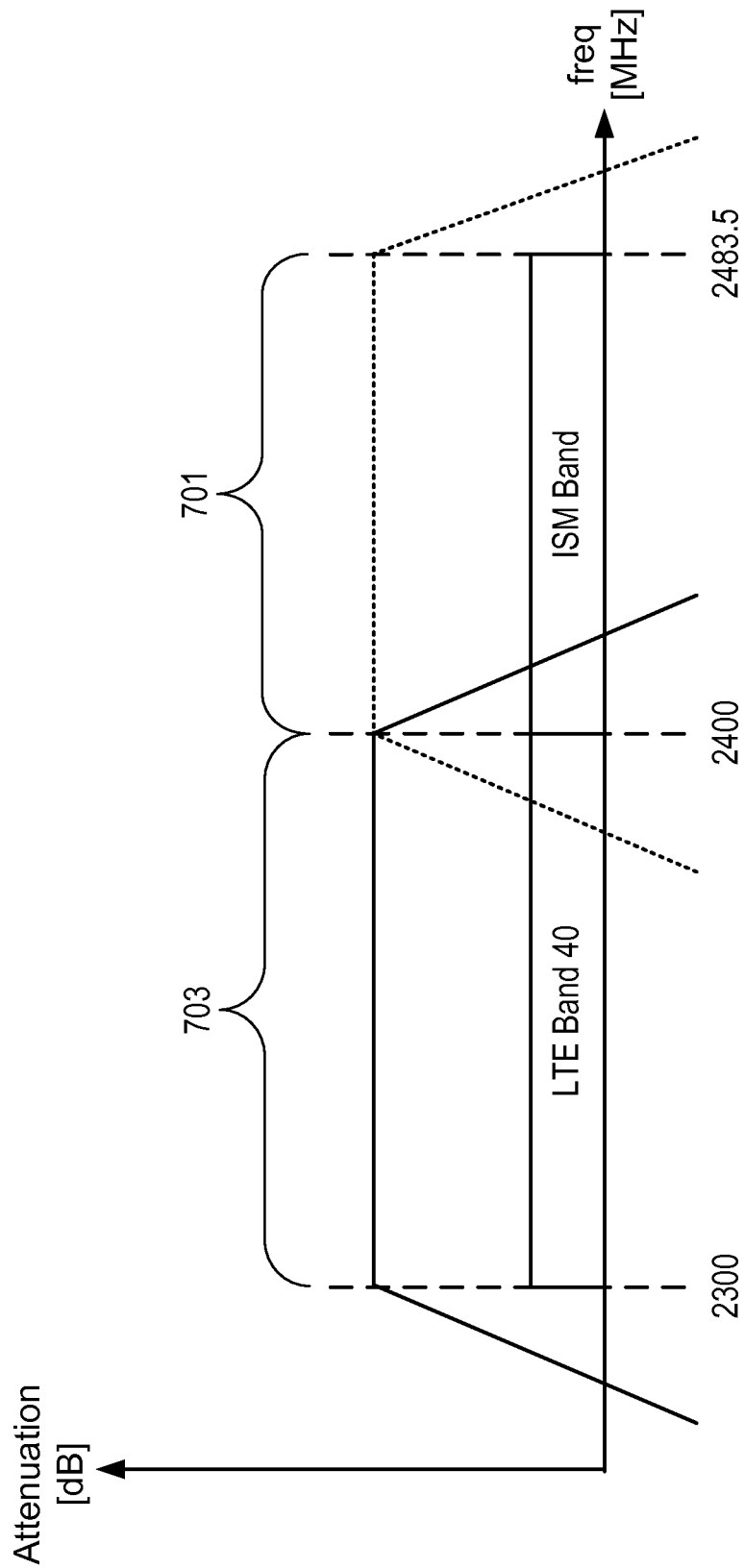
FIG. 7 shows a pass band of a Bluetooth® transceiver being coincident with the entirety of the ISM and a pass band of an LTE device being coincident with the entirety of the LTE Band 40.

What is important to note in this arrangement is that the receiver will go into saturation if the interferer is too close to the receive band even if the desired signal is conveyed on one or more channels within the receive band that are located a large frequency distance away from the interferer. (It will be recalled that the receiver does not operate on the entirety of the receive band all at once, but instead operates on a select number of one or more channels that are located within the receive band, leaving some of the receive band channels unused.) For example, suppose that an LTE transmitter is using the upper 20 MHz of Band 40 (i.e., 2380-2400 MHz). If the Bluetooth® receiver's band selective filter for the ISM band has a pass band that extends all the way down to 2400 MHz, then the front-end of the Bluetooth® receiver will be saturated irrespective of whether the desired Bluetooth® signal is at the low frequency end of the ISM band (e.g., at 2402 MHz) or at the upper frequency end of the ISM band (e.g., at 2480 MHz). Thus, a solution permitting use of the entireties of Band 40 and the ISM band of the LTE and Bluetooth® transceivers, respectively, (i.e., a solution that does not carve out a guard band between these two adjacent bands) would not work well. This is illustrated in FIG. 7 which shows a pass band 701 of a Bluetooth® transceiver being coincident with the entirety of the ISM and a pass band 703 of an LTE device being coincident with the entirety of the LTE Band 40. It can be seen that such filtering would permit an unacceptable level of OOB emissions from the LTE transmitter to enter the Bluetooth® receiver.

Comparing the filtering approaches illustrated by FIGS. 5 and 7 with one another, it can be seen that the solution in FIG. 5 (i.e., carving out a guard band out of part of the allocated frequency bands) works well but at the expense of giving up bandwidth that otherwise could have been used. This cost is paid regardless of whether there is an actual need for a coexistence solution at any given moment. By comparison, the solution illustrated by FIG. 7 (i.e., allowing each band selective filter to pass the entirety of the transceiver's allocated band) does not give up any bandwidth but, in general, cannot be expected to work.

In a first embodiment consistent with aspects of the invention, a method and apparatus are disclosed that makes use of an adjustable band selective filter for filtering out all but the desired frequency band. Such dynamic adjustability can be obtained by using select ones of two or more filters. Alternatively, dynamic adjustability can be achieved by means of a single filter that is expressly designed to provide adjustable filtering characteristics. Henceforth, all embodiments will be described with reference to dynamic filter adjustability that is obtained by means of selection between two fixed filters. However, it will be apparent to anyone of ordinary skill in the art that other means for obtaining this filtering flexibility work as well.

Figure 8:
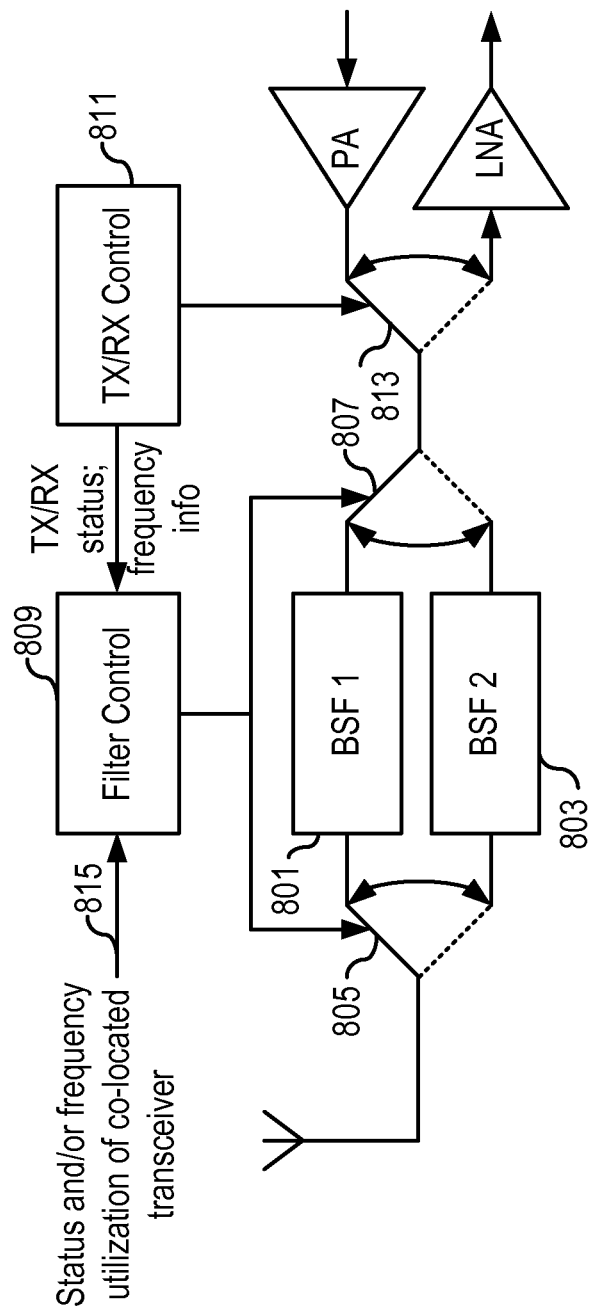
FIG. 8 is a block diagram of a transceiver in which band selective filtering characteristics can be adapted based on what frequency channel is being used.

Referring to FIG. 8, this is a block diagram of a transceiver in which band selective filtering characteristics can be adapted based on what frequency channel is being used. This same configuration can be used in each of the co-located transceivers within a UE. In this exemplary embodiment, the band selective filtering needed to support the full band comprises two band selective filters 801, 803 that are selectively inserted into or removed from the transceiver front end circuitry by means of switches 805, 807 that are ganged together in operation. Filter control circuitry 809 (e.g., one or more programmed processors and/or hardwired digital circuitry designed to implement the control functionality described herein) provides one or more control signals to the switches 805, 807, and determines which of the band selective filters 801, 803 is to be used at any given time. In some situations, such as occur in an LTE transceiver, the output from the filter control circuitry 809 is relatively static in that it only changes when the carrier frequency changes, which in turn might not happen during an entire session. Additional control circuitry, namely transmit/receive control circuitry (TX/RX control circuitry) 811 provides one or more control signals that change the setting of a corresponding switch 813 every time the transmission is altered from TX to RX or vice versa, so for LTE on a completely different time-scale. In order to be able to make decisions about which band selective filter to use, the filter control circuitry 809 receives one or more signals from the transmit/receive control circuitry 811 that indicate whether the transceiver is operating in transmit or in receive mode, and on which frequencies that operation is occurring. The filter control circuitry 809 also receives one or more signals 815 indicating the status and/or frequency utilization of the co-located transceiver.

FIG. 9a illustrates exemplary filters that can be used in the embodiment of FIG. 8 when the transceiver is an LTE transceiver operating on Band 40. In this instance, the first band selective filter 801 has a filter characteristic 901 that passes a lower part of the LTE Band 40, but begins cutting out some portion of the upper frequencies to, at least in part, create a guard band. The second band selective filter 803 has a filter characteristic 903 that passes an upper part of the LTE band 40, but begins cutting out some portion of the lower frequencies. Typically, the second band selective filter 803 would only be used when the very upper part of Band 40 is used. For the other cases, especially if it can be expected that there will be interference from the ISM band, the first band selective filter 801 will be used in order to allow for better attenuation of the interfering signal from the ISM band as well as to provide better attenuation of the OOB emissions from the LTE transceiver.

FIG. 9b illustrates corresponding adjustable filter characteristics for the band selective filters 801, 803 when used in the ISM band. In this instance, the first band selective filter 801 has a filter characteristic 905 that passes a lower part of the ISM band, but begins cutting out some portion of the upper frequencies. The second band selective filter 803 has a filter characteristic 907 that passes an upper part of the ISM band, but begins cutting out some portion of the lower frequencies in order to, at least in part, create a guard band between the ISM band and the LTE Band 40.

In this exemplary embodiment, the first band selective filter 801 (filter characteristic 905) is used only if the very lower part of the ISM band needs to be supported and in particular if it is known or expected that there will not be interference from Band 40 (e.g., if filter characteristic 901 is being used). Otherwise, filter characteristic 907 is used to create a guard band in the ISM band.

In another embodiment of the invention, the band selective filtering is adapted at the same rate as, and in correspondence to, the Transmission/Reception (TX/RX) switching. This strategy is useful, for instance, for a Bluetooth® transceiver because in that environment the frequency channel is changed between each transmission and reception. In this way it is possible to efficiently avoid transmitting at some of the frequencies (i.e., to avoid producing interfering OOB transmissions) while still being able to receive at these frequencies.

In an alternative embodiment in which band selective filtering is adapted based on Transmission/Reception switch, it may be the case that transmission at or near the adjacent border of the band is not an issue because there is no risk of interference to the other system, but the transceiver has to limit the number of channels that can be used near the adjacent border for reception in order to ensure that remaining frequencies within the band will not suffer from a saturation effect caused by the interfering system.

Figure 10:
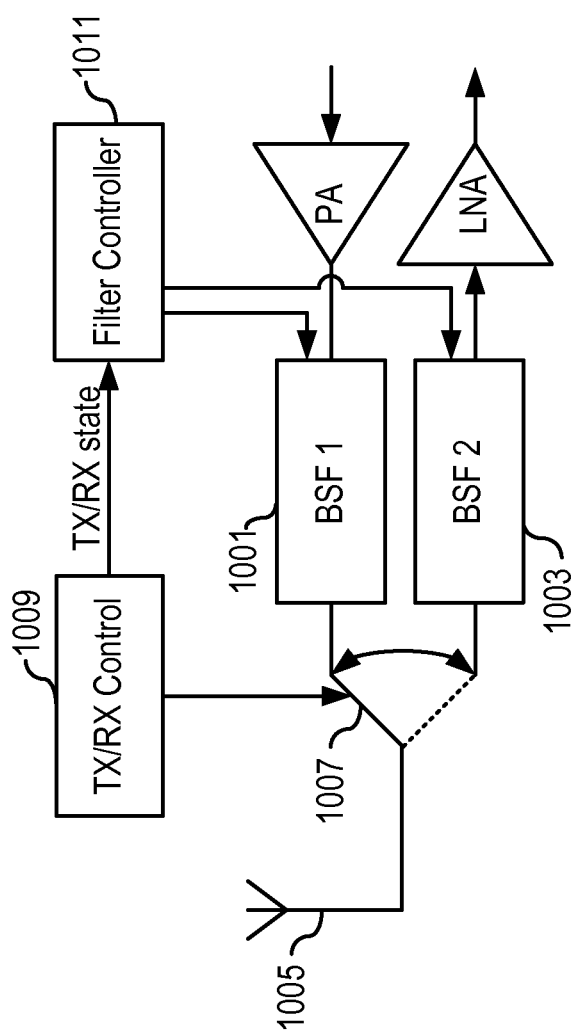
FIG. 10 is a block diagram of an exemplary arrangement that is useful for basing filtering switching on Transmission/Reception mode of the transceiver.

An exemplary arrangement useful for basing filtering switching on Transmission/Reception mode is illustrated in the block diagram of FIG. 10. Here, a first band selective filter 1001 is dedicated for use in the transmission path, and a second band selective filter 1003 is dedicated for use in the receive path. These are selectively coupled to a shared antenna 1005 by means of a switching arrangement 1007. The first band selective filter 1001 is coupled to one port of the switch 1007, and the second band selective filter 1003 is coupled to another port of the switch 1007. The common port of the switch is connected to the antenna 1005.

Signals for controlling the switch are generated and provided by Transmission/Reception control circuitry 1009, which can be designed (e.g., by means of one or more processors executing a set of program instructions) to operate in accordance with any of the embodiments described above. Signals for choosing the appropriate filter characteristics of the first and second band selective filters 1001, 1003 are generated and provided by filter control circuitry 1011. Using the various principles disclosed herein, the filter control circuitry 1011 can select different band selective filter characteristics individually for transmit and receive modes of operation.

In yet other embodiments, co-located transceivers can be designed to share the same antenna. From a user equipment point of view, this has the advantage of eliminating the need for one of the antennas. However, the challenge of coexistence between the two transceivers becomes even worse because the attenuation due to antenna coupling (assumed to be 10 dB in this description) instead has to be achieved by the filters.

Figure 11:
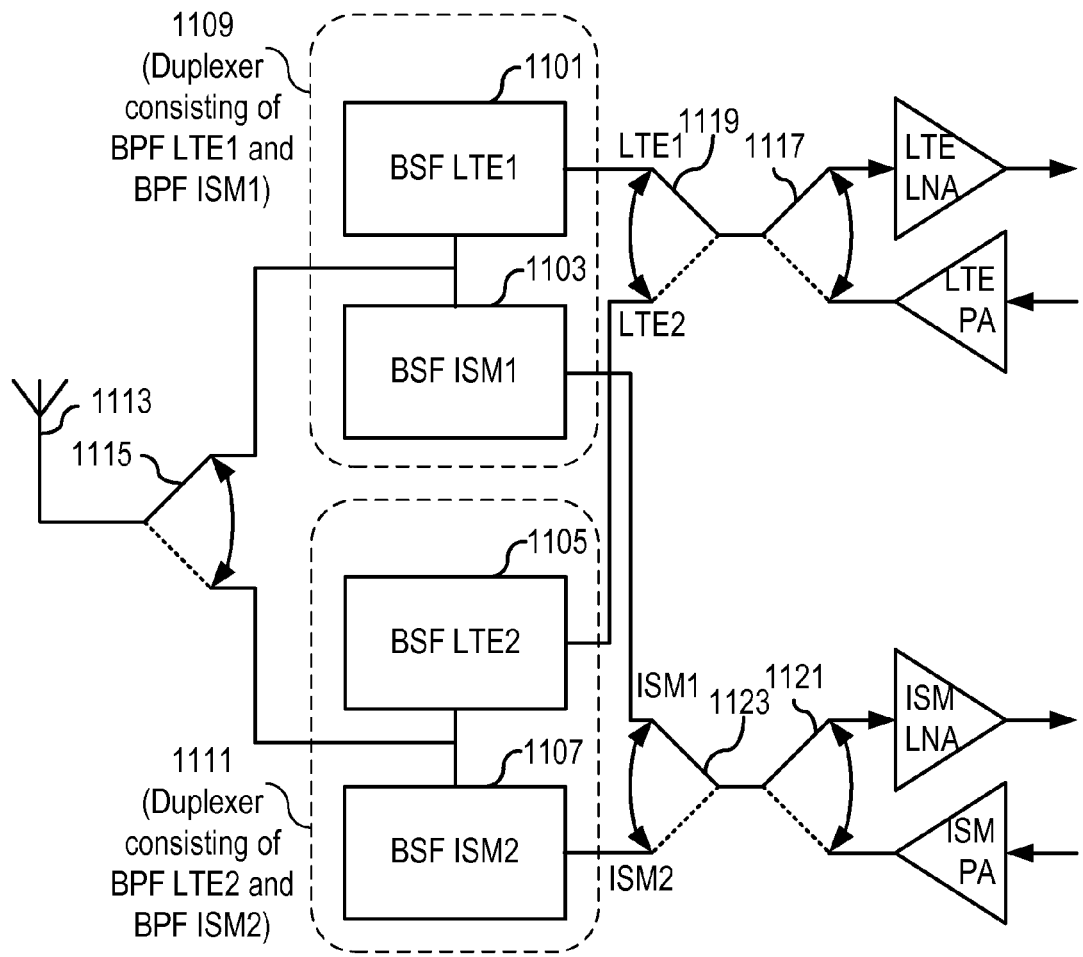
FIG. 11 is a block diagram of an exemplary embodiment that is useful for achieving co-existence when co-located transceivers share a same antenna.

Alternative embodiments such as that which is depicted in the block diagram of FIG. 11, address this problem. The exemplary configuration comprises four band selective filters 1101, 1103, 1105, 1107 that have corresponding filter characteristics LTE1, ISM1, LTE2, and ISM2.

The band selective filters are paired off so that an antenna side of the LTE1 band selective filter 1101 and an antenna side of the ISM1 band selective filter 1103 are connected to a first duplexer 1109, and an antenna side of the LTE2 band selective filter 1105 and an antenna side of the ISM2 band selective filter 1107 are connected to a second duplexer 1111.

The first and second duplexers 1109, 1111 are selectively coupled to a shared antenna 1113 by means of a switch 1115. Four more switches in the arrangement permit dynamic and flexible adaptation of the circuitry to suit particular operating requirements as they arise. In particular, a switch 1117 allows selection between the LTE receiver path and the LTE transmission path for coupling to one of the LTE band selective filters 1101, 1105. Which of the band selective filters is used is selected by another switch 1119—in one position of the switch 1119, the LTE transceiver is coupled to the band selective filter 1101 (having filter characteristic LTE1), and in the other position of the switch 1119, the LTE transceiver is coupled to the band selective filter 1105 (having filter characteristic LTE2).

A similar arrangement is provided for the other transceiver (e.g., a transceiver operating in the ISM band, such as a Bluetooth® transceiver). Specifically, a switch 1121 allows selection between the other transceiver's receiver path and the other transceiver's transmission path for coupling to one of the ISM band selective filters 1103, 1107. Which of the band selective filters is used is selected by another switch 1123—in one position of the switch 1123, the other transceiver is coupled to the ISM band selective filter 1103 (having filter characteristic ISM1), and in the other position of the switch 1123, the other transceiver is coupled to the ISM band selective filter 1107 (having filter characteristic ISM2).

To avoid cluttering the figure and thereby making it more difficult to understand, a depiction of control circuitry has been omitted. However, those of ordinary skill in the art will recognize that such circuitry needs to be present, and can be implemented in any of a number of ways based on the functionality described herein. Such implementations include, but are not limited to, the use of one or more programmable processors executing a set of program instructions that cause the processor(s) to carry out the described functionality.

Figure 12:
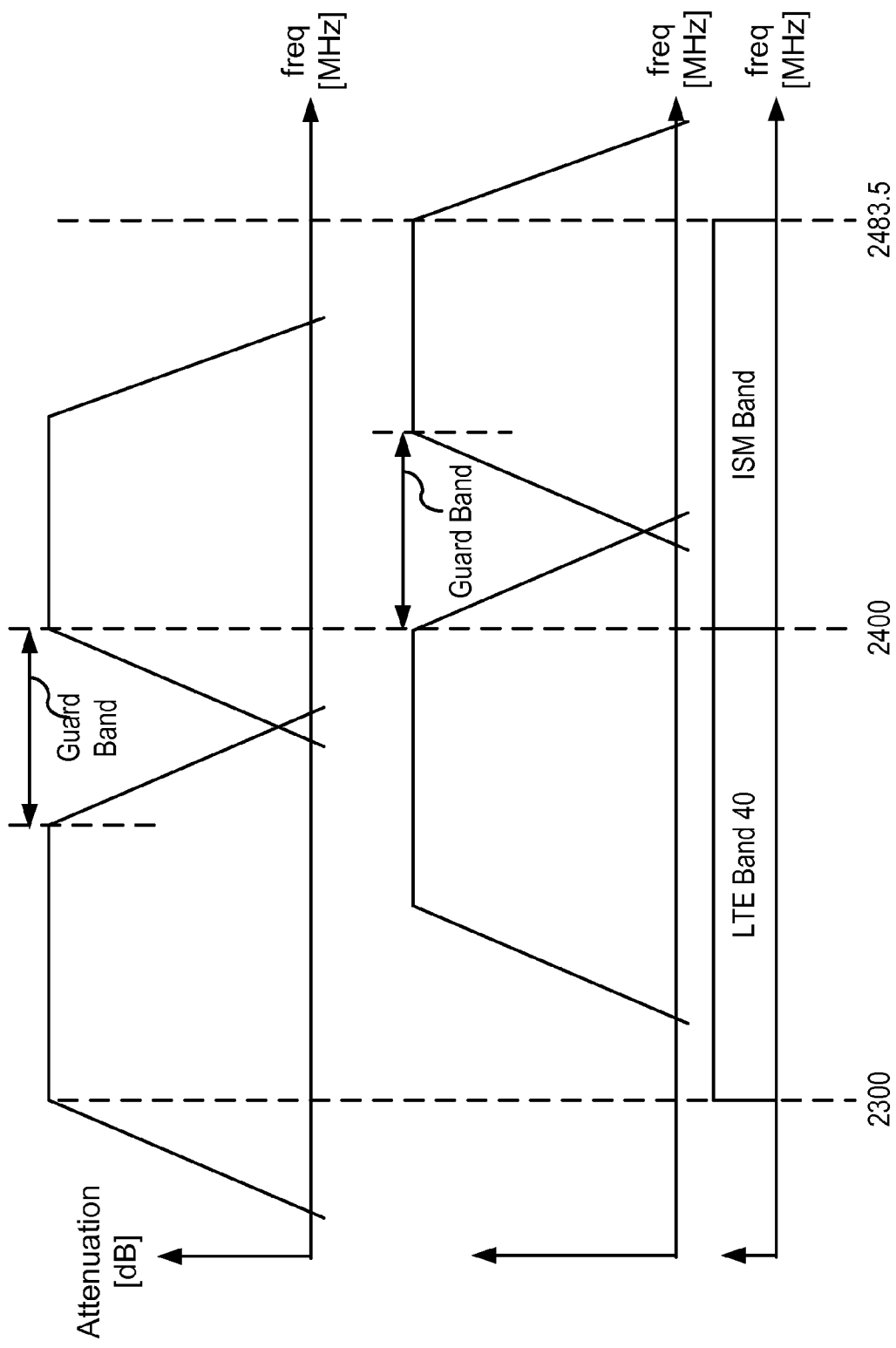
FIG. 12 illustrates exemplary amplitude functions of the band selective filters of FIG. 11.

FIG. 12 illustrates the corresponding amplitude functions of the band selective filters of FIG. 11. The purpose of the graphs is to illustrate where attenuation takes place relative to the frequency bands involved. The size of the illustrated guard bands relative to the illustrated bandwidths of Band 40 and of the ISM band can be less than, the same as, or greater than those that are illustrated in the figure. It can be seen that in one case (see upper-most graph) the filters of the two transceivers are adjusted such that the guard band is located more in Band 40 than in the ISM band (in this embodiment, the guard band is located entirely within Band 40, but this could be different in other embodiments) thereby permitting use of the lower-most frequencies of the ISM band, whereas in the other case (lower-most graph) the guard band is located more in the ISM band than in the LTE Band 40 (in this embodiment, the guard band is located entirely within the ISM band, but this could be different in other embodiments), thereby permitting use of the uppermost frequencies of the LTE Band 40.

Considering just the band selective filter within the LTE transceiver, it can be seen that the filter adjustment involves in one case (e.g., as illustrated by the top graph) adjusting the filter such that a corner frequency of the filter is located within the LTE band at a first spectral distance from the adjacent border of the LTE band (in this example, the spectral distance is at least large enough to itself create a guard band, but this could be different in other embodiments), and in another case (e.g., as illustrated by the lower-most graph) adjusting the filter such that a corner frequency of the filter is less than the spectral distance away from the adjacent border of the LTE band (in this example, the corner frequency is coincident with the adjacent border of the LTE band, but this could be different in other embodiments).

A similar description can be made with respect to the band selective filter within the ISM transceiver: It can be seen that the filter adjustment involves in one case (e.g., as illustrated by the middle graph) adjusting the filter such that a corner frequency of the filter is located within the ISM band at a first spectral distance from the adjacent border of the ISM band (in this example, the spectral distance is at least large enough to itself create a guard band, but this could be different in other embodiments), and in another case (e.g., as illustrated by the uppermost graph) adjusting the filter such that a corner frequency of the filter is less than the spectral distance away from the adjacent border of the ISM band (in this example, the corner frequency is coincident with the adjacent border of the ISM band, but this could be different in other embodiments).

Another example where interference is a potential problem is when the operation of an LTE transceiver interferes with a WLAN transceiver. It will be readily apparent to those of ordinary skill in the art that the embodiments described above with respect to coexistence between LTE and Bluetooth® transceivers is also applicable to the LTE/WLAN coexistence problem.

Figure 13:
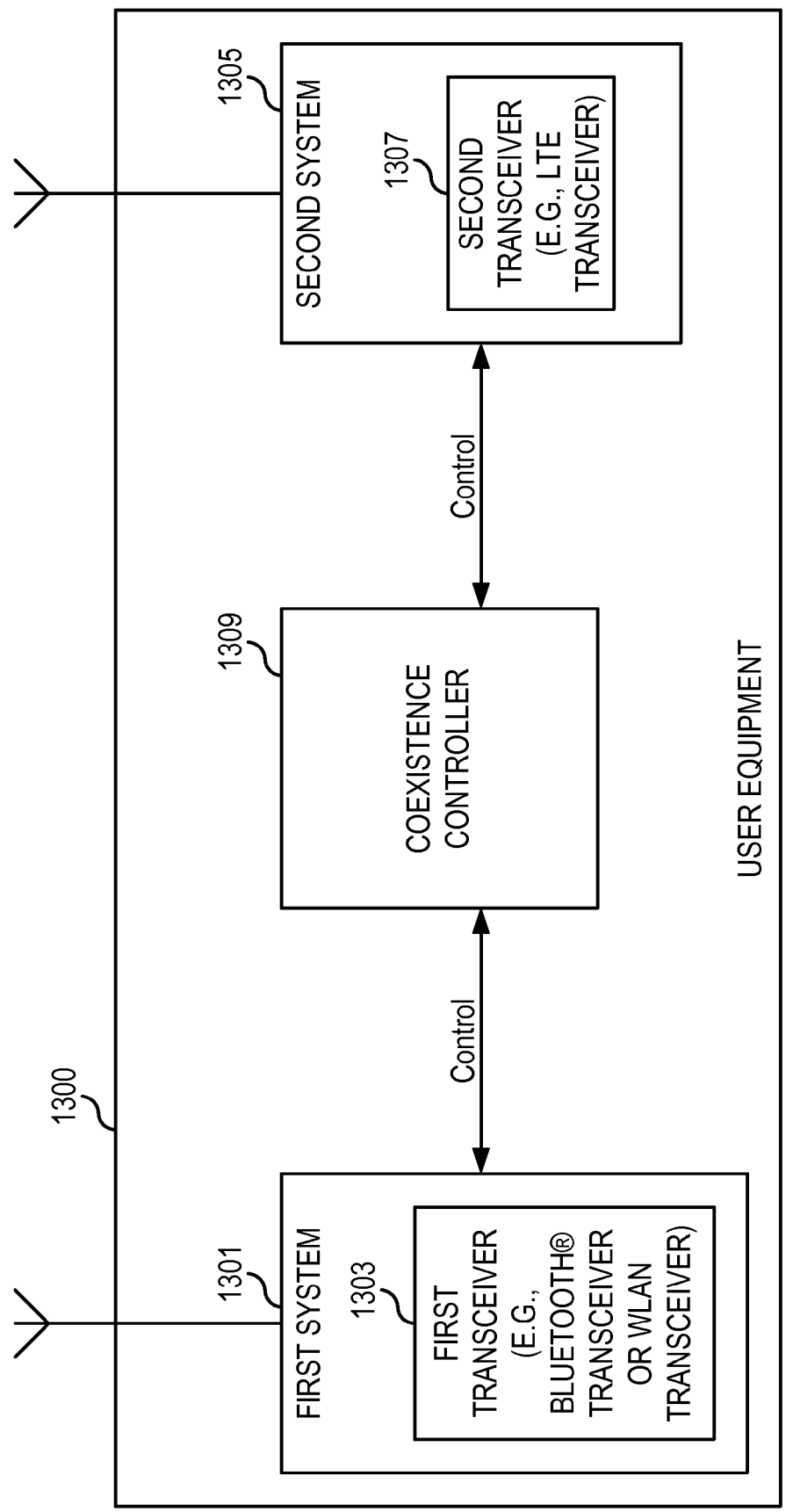
FIG. 13 is a block diagram of an exemplary user equipment having co-located first and second transceivers and coexistence control circuitry in accordance with aspects of embodiments consistent with the invention.

In a device in which LTE and Bluetooth® are expected to coexist, the choice of band selective filter settings for the two systems is preferably based on knowledge about the needs for both systems. This knowledge can be made available in a connection manager of the equipment, which then determines what filters to use. FIG. 13 is a block diagram of an exemplary user equipment 1300 having a first system 1301 comprising a first transceiver 1303. The first transceiver can operate in accordance with any of a number of known air interface standards, such as, but not limited to, the Bluetooth® standards and the WLAN standards. The user equipment 1300 also includes a second system 1305 comprising a second transceiver 1307. The second transceiver 1307 can operate in accordance with any of a number of known air interface standards, such as, but not limited to, the LTE standard. Of relevance to aspects of the invention, the first and second transceivers 1303, 1307 are expected to operate concurrently with one another on adjacent bands without an intervening guard band.

To enable coexistence between the two systems 1301, 1305 in a way that facilitates each system's full use of its allocated band while at the same time making filtering techniques a viable option for eliminating interference problems, the user equipment further includes coexistence control circuitry 1309 operatively coupled to each of the first and second systems 1301, 1305. The coexistence controller can be implemented to function as described herein in any of a number of ways, such as but not limited to one or more programmable processors adapted to execute a set of program instructions that cause the processor(s) to carry out the various functions described herein. Hardwired implementations (e.g., by means of interconnected digital logic elements) are also easily derivable by one of ordinary skill in the art, based on the functional descriptions provided herein.

In one exemplary embodiment, it is assumed that the first transceiver 1303 is a Bluetooth® transceiver and that the second transceiver 1307 is an LTE transceiver operating in Band 40. For embodiments such as this, the coexistence control circuitry 1309 can be configured to carry out functionality such as that depicted in FIG. 14, which is, in one respect, a flow diagram of exemplary steps/processes carried out by coexistence control circuitry 1309 (e.g., in a user equipment) in accordance with aspects of the invention in an exemplary embodiment. In another respect, FIG. 14 can be considered to depict control circuitry 1400 (e.g. one or more programmable processors combined with a suitable set of program instructions) comprising various circuit elements whose function is depicted within the figure and described herein.

In accordance with this exemplary embodiment, the circuitry ascertains whether the LTE transceiver (second transceiver 1307) is using frequencies above a given threshold frequency, such as 2380 MHz (decision block 1401). If it is ("YES" path out of decision block 1401) then the two transceivers are operated to create a guard band that lies at least primarily (if not entirely) within the ISM band. In this embodiment, this is accomplished by controlling the LTE transceiver 1307 to use filter characteristics that have herein been referred to as BSF LTE2 (step 1403). Also, the Bluetooth® transceiver (first transceiver 1303) is controlled to use filter characteristics that have herein been referred to as BSF ISM2 (step 1405). Additionally, the Bluetooth transceiver (first transceiver 1303) is controlled so as to avoid using frequencies less than a given threshold frequency, such as 2420 MHz (step 1407). Such control can be accomplished within a Bluetooth® conforming device by, for example, the use of Adaptive Frequency Hopping (AFH).

Returning to a consideration of decision block 1401, if the LTE transceiver (second transceiver 1307) is not using frequencies above the given threshold frequency, such as 2380 MHz ("NO" path out of decision block 1401), then the two transceivers are operated to create a guard band that lies at least primarily (if not entirely) within the LTE Band 40. In this embodiment, this is accomplished by controlling the LTE transceiver 1307 to use filter characteristics that have herein been referred to as BSF LTE1 (step 1409). Also, the Bluetooth® transceiver (first transceiver 1303) is controlled to use either one of the filter characteristics that have herein been referred to as BSF ISM1 and BSF ISM2 (step 1411).

Figure 14:
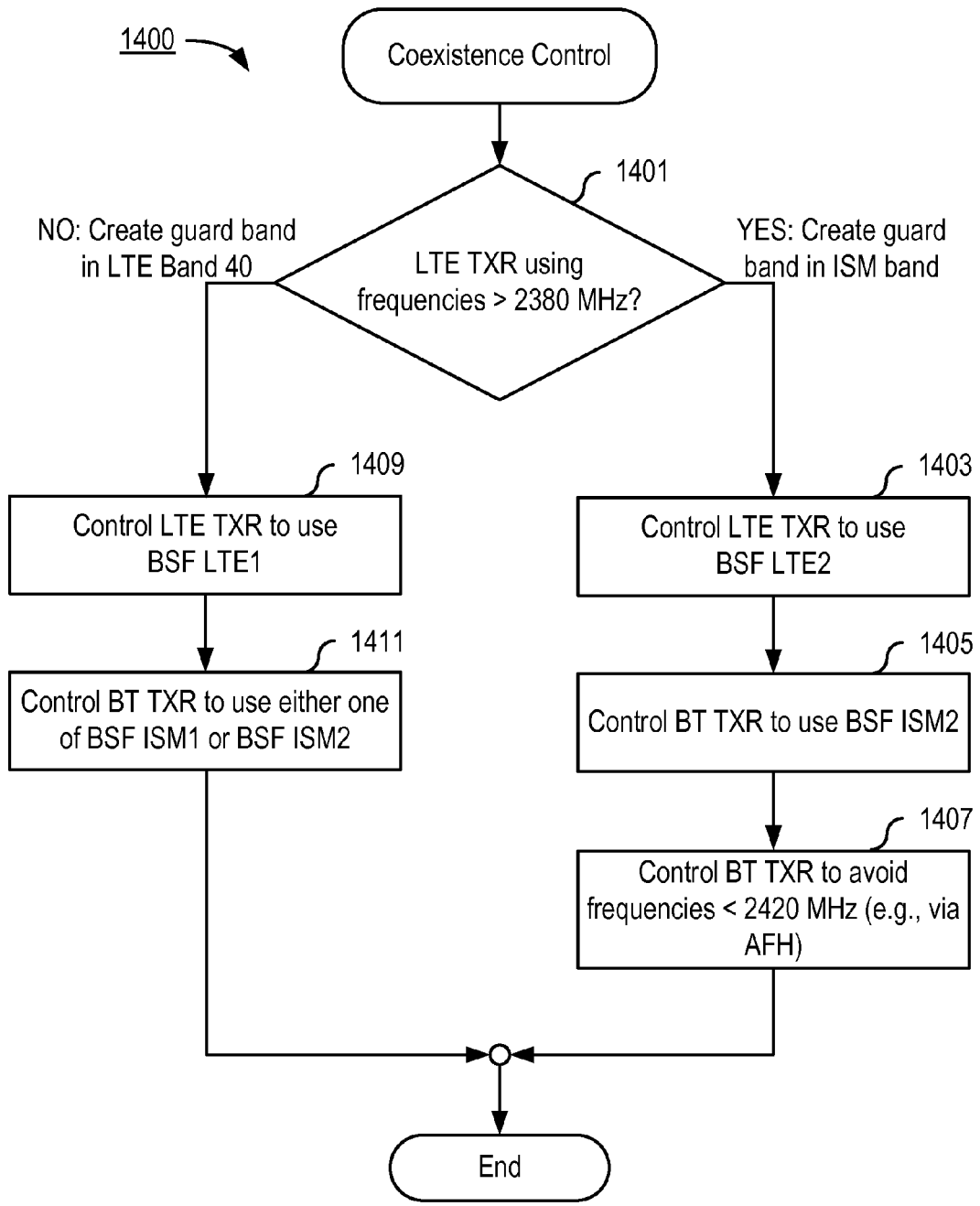
FIG. 14 is, in one respect, a flow diagram of exemplary steps/processes carried out by, for example, coexistence control circuitry such as that depicted in FIG. 13.

It can be seen that the strategy adopted with respect to embodiments illustrated by FIG. 14 is that if the LTE transceiver is using frequencies close to the ISM band (e.g., above 2380 MHz, but this could be different in alternative embodiments), a guard band between Band 40 and the ISM band is created by using the lower 20 MHz of the ISM band. On the other hand, if the LTE transceiver is not using the upper 20 MHz (or other bandwidth in other embodiments) of Band 40, then the 20 MHz guard band is instead created as the upper 20 MHz of LTE Band 40, ensuring that the entire ISM band can be used.

Figure 15:
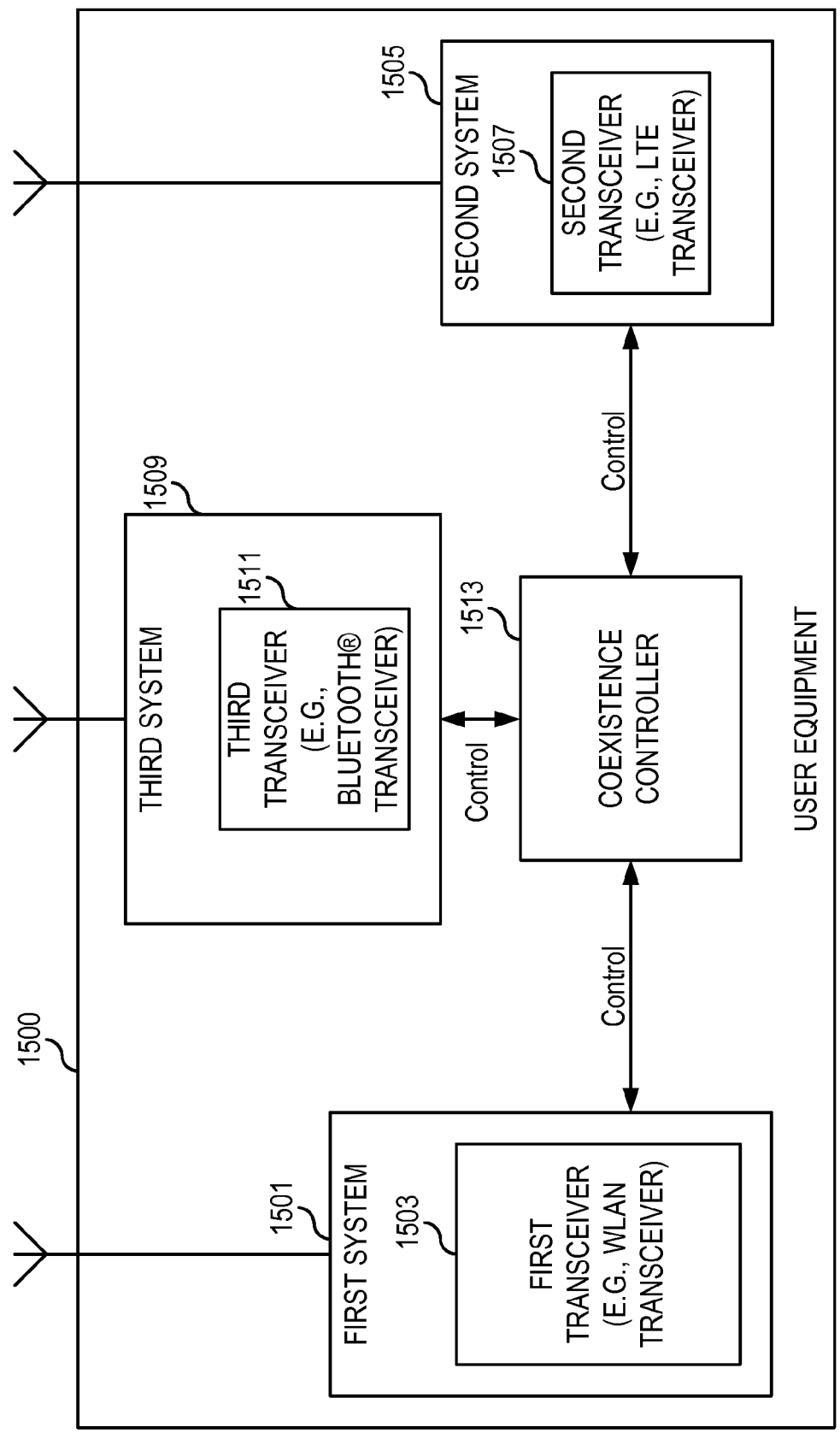
FIG. 15 is a block diagram of an exemplary user equipment having co-located first, second, and third transceivers and coexistence control circuitry in accordance with aspects of embodiments consistent with the invention.

To further illustrates aspects of the invention, the description will now focus on an embodiment that achieves coexistence between an LTE transceiver, a Bluetooth® transceiver, and a WLAN transceiver all within a same device. To illustrate this arrangement, reference is made to FIG. 15, which is a block diagram of an exemplary user equipment 1500 having a first system 1501 comprising a first transceiver 1503. In this example, the first transceiver can operate in accordance with the WLAN standards. The user equipment 1500 also includes a second system 1505 comprising a second transceiver 1507. In this example, the second transceiver 1507 operates in accordance with the LTE standard. The user equipment 1500 also includes a third system 1509 comprising a third transceiver 1511. The third transceiver 1511 operates in accordance with the Bluetooth® standards. Of relevance to aspects of the invention, the first, second and third transceivers 1503, 1507, 1511 are expected to operate concurrently with one another on adjacent bands (or in the case of WLAN and Bluetooth®, the same band) without an intervening guard band.

To enable coexistence between the three systems 1501, 1505, 1509 in a way that facilitates each system's full use of its allocated band while at the same time making filtering techniques a viable option for eliminating interference problems, the user equipment further includes coexistence control circuitry 1513 operatively coupled to each of the first, second, and third systems 1501, 1505, 1509. The coexistence controller can be implemented to function as described herein in any of a number of ways, such as but not limited to one or more programmable processors adapted to execute a set of program instructions that cause the processor(s) to carry out the various functions described herein. Hardwired implementations (e.g., by means of interconnected digital logic elements) are also easily derivable by one of ordinary skill in the art, based on the functional descriptions provided herein. In various embodiment, the coexistence control circuitry 1513 uses knowledge of what frequencies are presently being used by the LTE and/or WLAN transceivers 1507, 1503. Based on this information, the coexistence control circuitry 1309 determines which filters to use in each of the first and second transceivers 1303, 1305.

Figure 16:
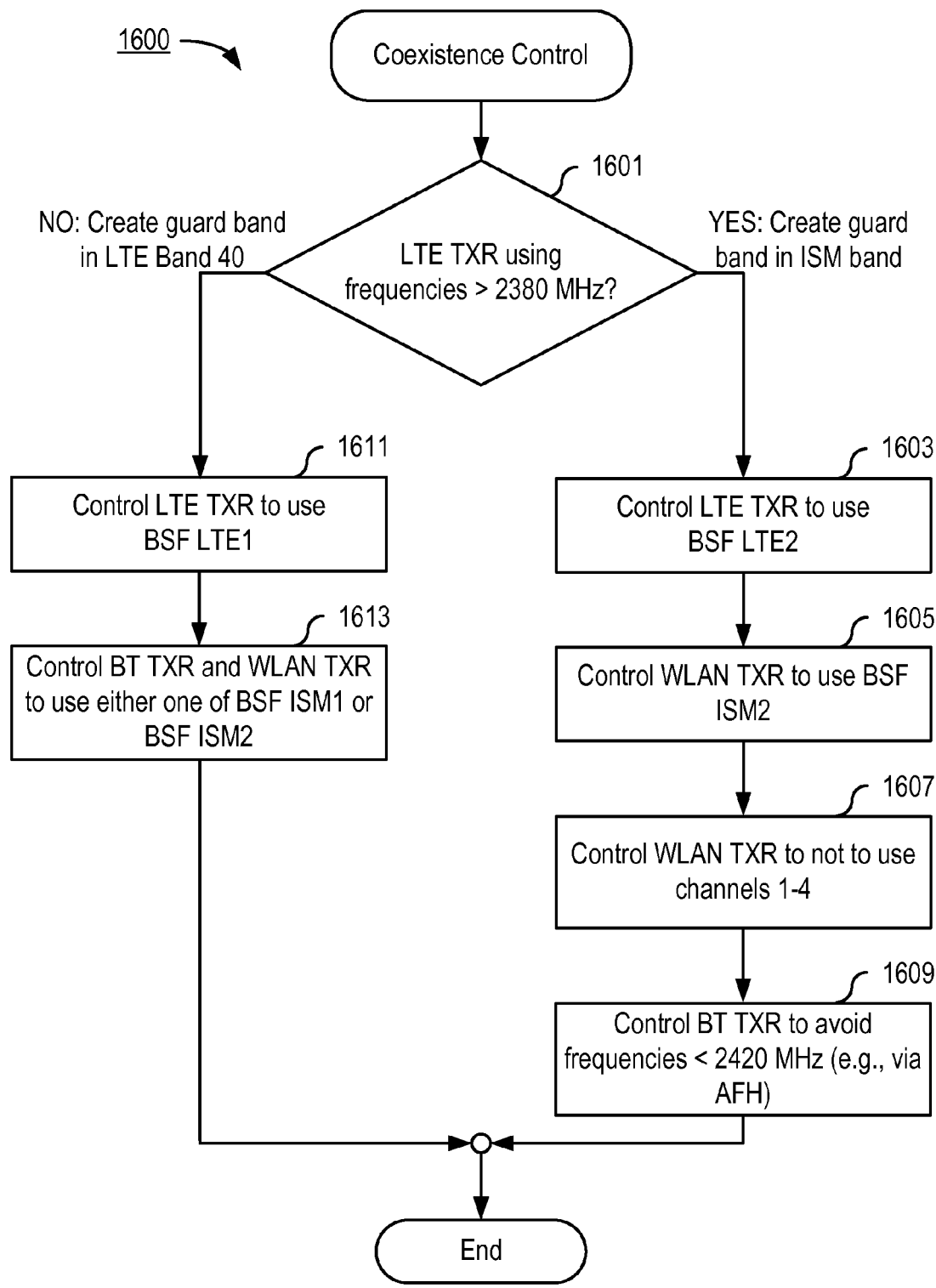
FIG. 16 is, in one respect, a flow diagram of exemplary steps/processes carried out by, for example, coexistence control circuitry such as that depicted in FIG. 15.

More specifically in one set of embodiments, if the LTE transceiver 1507 is not using the upper 20 MHz (or other bandwidth in other embodiments) of Band 40 and the WLAN transceiver 1503 is not using the lower 20 MHz (or other bandwidth in other embodiments) of the ISM band, then the coexistence control circuitry 1513 can choose to put the guard band either in Band 40 or in the ISM band. However, if the LTE and WLAN transceivers 1507, 1503 are both scheduled to use their respective band that is just adjacent to 2400 MHz (i.e., channels at or near their adjacent borders), some kind of prioritization is needed. The algorithm presented below with reference to FIG. 16 is one possible approach for the case in which the LTE, WLAN, and Bluetooth® transceivers 1507, 1503, 1511 are all operating, and the coexistence control circuitry 1513 gives priority to the operations of the LTE transceiver 1507. (It will be observed that coexistence between the WLAN transceiver 1503 and the Bluetooth® transceiver 1511, which both operate on the ISM band, is achieved by means of the Bluetooth® transceiver's use of frequency hopping throughout the ISM band.)

Accordingly, the coexistence control circuitry 1513 can be configured to carry out functionality such as that depicted in FIG. 16, which is, in one respect, a flow diagram of exemplary steps/processes carried out by coexistence control circuitry 1513 (e.g., in a user equipment) in accordance with aspects of the invention in an exemplary embodiment. In another respect, FIG. 16 can be considered to depict control circuitry 1600 (e.g. one or more programmable processors combined with a suitable set of program instructions) comprising various circuit elements whose function is depicted within the figure and described herein.

In accordance with this exemplary embodiment, the circuitry ascertains whether the LTE transceiver (second transceiver 1507) is using frequencies above a given threshold frequency, such as 2380 MHz (decision block 1601). If it is ("YES" path out of decision block 1601) then the three transceivers are operated to create a guard band that lies at least primarily (if not entirely) within the ISM band. In this embodiment, this is accomplished by controlling the LTE transceiver 1507 to use filter characteristics that have herein been referred to as BSF LTE2 (step 1603). Also, the WLAN transceiver (first transceiver 1503) is controlled to use filter characteristics that have herein been referred to as BSF ISM2 (step 1605). Additionally, the WLAN transceiver (first transceiver 1503) is controlled so as to avoid using a certain number of its channels next to the adjacent border of the ISM band (e.g., to avoid using WLAN channels 1-4) (step 1607). Additionally, the Bluetooth® transceiver (third transceiver 1511) is controlled so as to avoid using frequencies less than a given threshold frequency, such as 2420 MHz (step 1609). Such control can be accomplished within a Bluetooth® conforming device by, for example, the use of Adaptive Frequency Hopping (AFH). In this way, the operation of the WLAN and Bluetooth® transceivers 1503, 1511 is moved away from a given bandwidth adjacent to the adjacent border of the ISM band, thereby creating a guard band within the ISM band.

Returning to a consideration of decision block 1601, if the LTE transceiver (second transceiver 1507) is not using frequencies above the given threshold frequency, such as 2380 MHz ("NO" path out of decision block 1601), then the three transceivers are operated to create a guard band that lies at least primarily (if not entirely) within the LTE Band 40. In this embodiment, this is accomplished by controlling the LTE transceiver 1507 to use filter characteristics that have herein been referred to as BSF LTE1 (step 1611). Also, the WLAN and Bluetooth® transceivers (first transceiver 1503 and third transceiver 1511) are controlled to use either one of the filter characteristics that have herein been referred to as BSF ISM1 and BSF ISM2 (step 1613).

In the embodiment described with reference to FIG. 16, the only case that will actually cause a conflict is when the WLAN transceiver 1503 needs to use any of the WLAN channels 1-4, and cannot be re-directed to another channel at a time when the LTE transceiver 1507 is using the upper 20 MHz of LTE Band 40.

Figure 17:
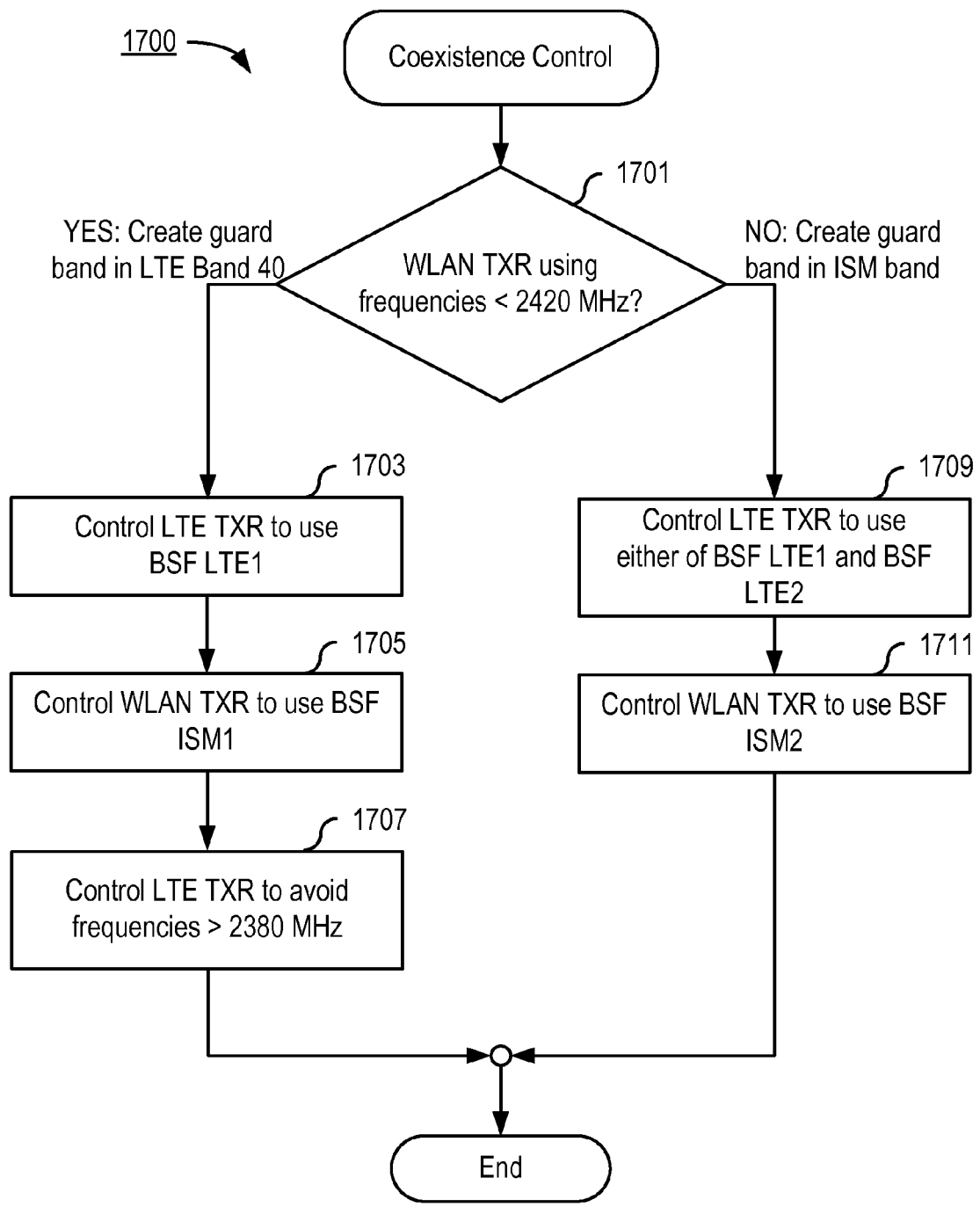
FIG. 17 is, in one respect, a flow diagram of alternative exemplary steps/processes carried out by, for example, coexistence control circuitry such as that depicted in FIG. 13 when it is desired to prioritize receive operations over transmission operations.

In alternative embodiments, and with reference again being made to FIG. 13, the coexistence control circuitry 1309 prioritizes the operations of the WLAN transceiver 1303 over those of the LTE transceiver 1307. Such embodiments will now be described with reference to FIG. 17, which is, in one respect, a flow diagram of exemplary steps/processes carried out by coexistence control circuitry 1309 (e.g., in a user equipment) in accordance with aspects of the invention in an exemplary embodiment. In another respect, FIG. 17 can be considered to depict control circuitry 1700 (e.g. one or more programmable processors combined with a suitable set of program instructions) comprising various circuit elements whose function is depicted within the figure and described herein.

In accordance with this exemplary embodiment, the circuitry ascertains whether the WLAN transceiver (first transceiver 1303) is using frequencies below a given threshold frequency, such as below 2420 MHz (decision block 1701). If it is ("YES" path out of decision block 1701) then the two transceivers are operated to create a guard band that lies at least primarily (if not entirely) within the LTE Band 40. In this embodiment, this is accomplished by controlling the LTE transceiver 1307 to use filter characteristics that have herein been referred to as BSF LTE1 (step 1703). Also, the WLAN transceiver (first transceiver 1303) is controlled to use filter characteristics that have herein been referred to as BSF ISM1 (step 1705). Additionally, the LTE transceiver (first transceiver 1303) is controlled so as to avoid using a certain number of its channels next to the adjacent border of the LTE Band 40 (e.g., to avoid using frequencies higher than 2380 MHz) (step 1707). In this way, the operation of the LTE transceiver 1305 is moved away from a given bandwidth adjacent to the adjacent border of the LTE Band 40, thereby creating a guard band within the LTE Band 40.

Returning to a consideration of decision block 1701, if the WLAN transceiver (first transceiver 1303) is not using frequencies lower than the given threshold frequency, such as 2420 MHz ("NO" path out of decision block 1701), then the two transceivers are operated to create a guard band that lies at least primarily (if not entirely) within the ISM band. In this embodiment, this is accomplished by controlling the LTE transceiver 1307 to use either of the filter characteristics that have herein been referred to as BSF LTE1 and BSF LTE2 (step 1709). Also, the WLAN transceiver (first transceiver 1303) is controlled to use the filter characteristics that have herein been referred to as BSF ISM2 (i.e., to create a guard band within the ISM band) (step 1711).

It should be understood that the above descriptions with specific numerical values and specific standards are only used to more easily illustrate the concept of the invention. The principle of using flexible (i.e., dynamically changeable) band selective filtering are applicable for other scenarios as well.

In another embodiment at least one of the systems is using FDD where the transmission band is closer to the potential interferer than the receiver band. One such example can be found when an LTE transceiver is using LTE Band 7, where the uplink transmissions take place on 2500-2570 MHz and downlink transmissions take place on 2620-2690 MHz. For a system that uses FDD, there is one filter for the transmission path and another filter for the receive path. For the scenario with potential interference between LTE Band 7 and the ISM band, it is mostly of interest to consider using a flexible filter for the transmission path, while keeping the receiver's filter fixed.

In another embodiment, still assuming FDD, it is the receiver's band that is closer to the potential interferer. In this case, an implementation might consist of a dynamically changeable receiver filter while keeping the transmitter's filter fixed.

In the various embodiments described above, the adjustable filter characteristics were shown as being achieved by means of two fixed band selective filters that together cover the entire band of interest. It should be understood that this is merely a non-limiting example. As one of many possible alternatives, it is also feasible to have two filters in which one covers the entire band and the other covers only part of the band. For instance, referring to the two filters for the ISM band, BSF BT1 might be a filter that would always be used whenever interference is not an issue (e.g., when a transceiver that is capable of operating in the adjacent band is presently not operating in the adjacent band, or when a guard band is created within the adjacent band as discussed throughout this description because the transceiver that operates in the adjacent band is not using the adjacent frequencies), covering the entire band, whereas the other filter characteristic, BSF BT2 is used only when there is interference in LTE Band 40.

Figure 18:
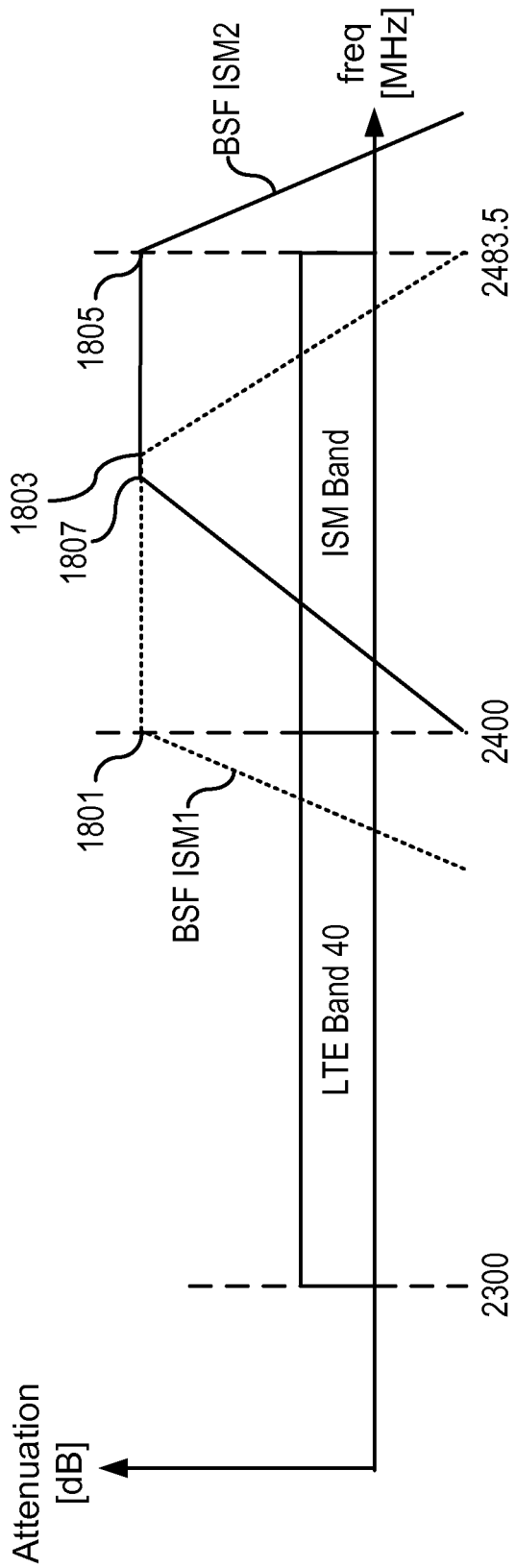
FIG. 18 is a graph of exemplary filter characteristics useable in some embodiments of the invention.

In yet another alternative approach, the two dynamically changeable filters are built to complement each other in the following sense. Taking ISM band filtering as an example, BSF ISM1 can be optimized for the lower part of the band, giving up some of the steepness at the other side because its attenuation can be allowed to start somewhere well within the band, whereas the other filter, BSF ISM2 in a similar way is optimized for the upper part of the band. This concept is illustrated in FIG. 18. In this example, one corner frequency 1801 of BSF ISM1 is coincident with the adjacent border of the ISM band and the other corner frequency 1803 of BSF ISM1 occurs a little past the midway point of the ISM band. Considering the other filter, one corner frequency 1805 is coincident with the nonadjacent border of the ISM band and the other corner frequency 1807 occurs a little before the midway point of the ISM band.

In yet another embodiment, a cascade of one wide band selective filter having a bandwidth covering the entire band is cascaded with another filter (e.g., a band pass filter, low pass filter, or high pass filter) as appropriate to effectively narrow the aggregate bandwidth. When unused, the narrowing filter is by-passed.

As already indicated above, the flexibility of the filters might also be obtained by using one tunable filter rather than several filters. That is, in yet other embodiments, one or more of the band selective filters is tunable, for example by means of thin film bulk acoustic resonator (FBAR) filters. In such cases, adjusting the filter to have a more narrow bandwidth can be used to provide (more of) a guard band.

The invention has been described with reference to particular embodiments. However, it will be readily apparent to those skilled in the art that it is possible to embody the invention in specific forms other than those of the embodiment described above.

For example, in the variously described embodiments, various circuit elements have been depicted as operating under the direction of a single controller. However, this depiction is merely made to facilitate the reader's understanding of the various aspects of the embodiments. Those of ordinary skill in the art will readily be able to adapt the principles set forth herein in alternative embodiments in which the "controller" is not a single circuit component, but rather is a collection of control circuitry distributed throughout the communication device. For example, some control aspects can be considered to be under the direction of circuitry embodied as part of the first transceiver, some other control aspects can be considered to be under the direction of circuitry embodied as part of the second transceiver, and other control aspects can be considered to be under the direction of circuitry that is shared between the several transceivers and perhaps other circuit elements as well. As used throughout this description and claims, the single term "controller" means any and all such interpretations, and is not intended to refer only to circuitry that is separate and apart from other components of the communication device.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a communication device having a controller operatively connected to a plurality of transceivers including a first transceiver and a second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border, the method comprising:
   operating the first and second transceivers concurrently in a frequency division multiplexing mode of operation wherein interference at the first transceiver caused by transmissions of the second transceiver is mitigated, at least in part, by means of band select filtering;
   the controller detecting which one or more channels of the second frequency band are being used by the second transceiver and based on an outcome of the detecting, performing:
      if any of the detected one or more channels of the second frequency band are adjacent the first frequency band, then adjusting one or more of a transmit filter of the second transceiver and a receive filter of the first transceiver to create a first guard band that is located more in the first frequency band than in the second frequency band;
      if none of the detected one or more channels of the second frequency band are adjacent the first frequency band, then adjusting one or more of the transmit filter of the second transceiver and the receive filter of the first transceiver to create a second guard band that is located more in the second frequency band than in the first frequency band,
   wherein adjusting one or more of the transmit filter of the second transceiver and the receive filter of the first transceiver to create the first guard band that is located more in the first frequency band than in the second frequency band comprises:
   adjusting the receive filter of the first transceiver such that a corner frequency of the receive filter is within the first frequency band at a first spectral distance from the adjacent border of the first frequency band.

2. The method of claim 1, wherein adjusting one or more of the transmit filter of the second transceiver and the receive filter of the first transceiver to create the second guard band that is located more in the second frequency band than in the first frequency band comprises:
   adjusting the receive filter of the first transceiver such that the corner frequency of the receive filter is less than the first spectral distance from the adjacent border of the first frequency band.

3. The method of claim 2, wherein adjusting one or more of the transmit filter of the second transceiver and the receive filter of the first transceiver to create the second guard band that is located more in the second frequency band than in the first frequency band comprises:
   adjusting the transmit filter of the second transceiver such that a corner frequency of the transmit filter is within the second frequency band at a second spectral distance from the adjacent border of the first frequency band, wherein a spectral distance between the corner frequency of the transmit filter of the second transceiver and the corner frequency of the receive filter of the first transceiver is sufficient to create a guard band between the first and second frequency bands.

4. The method of claim 3, wherein adjusting the receive filter of the first transceiver such that the corner frequency of the receive filter is less than the first spectral distance from the adjacent from the adjacent border of the first frequency band comprises:
   adjusting the receive filter of the first transceiver such that the corner frequency of the receive filter is located at the adjacent border of the first frequency band.

5. The method of claim 1, comprising:
if any of the detected one or more channels of the second frequency band are adjacent the first frequency band, then the controller causing the first transceiver to operate in a way that avoids receiving channels located within the first guard band.

6. The method of claim 1, wherein the first and second frequency bands being adjacent one another means that an adjacent border of the first frequency band is within 20 MHz of an adjacent border of the second frequency band.

7. The method of claim 1, wherein the receive filter is a band selective filter that has a pass band whose bandwidth is narrower than a bandwidth of the first frequency band, and wherein adjusting the receive filter comprises adjusting a frequency location of the receive filter pass band.

8. The method of claim 1, wherein the receive filter comprises:
a plurality of band selective filters, each passing a different portion of the first frequency band;
a switching arrangement operatively coupled to the plurality of band selective filters to enable only one of the band selective filters to be included within a receive path of the first transceiver.

9. The method of claim 1, wherein the transmit filter comprises:
a plurality of band selective filters, each passing a different portion of the second frequency band;
a switching arrangement operatively coupled to the plurality of band selective filters to enable only one of the band selective filters to be included within a transmit path of the second transceiver.

10. A method of operating a communication device having a controller operatively connected to a plurality of transceivers including a first transceiver and a second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border, the method comprising:
operating the first and second transceivers concurrently in a frequency division multiplexing mode of operation wherein interference at the first transceiver caused by transmissions of the second transceiver is mitigated, at least in part, by means of band select filtering;
the controller detecting which one or more channels of the first frequency band are being used by the first transceiver and based on an outcome of the detecting, performing:
if any of the detected one or more channels of the first frequency band are adjacent the second frequency band, then adjusting one or more of a transmit filter of the second transceiver and a receive filter of the first transceiver to create a first guard band that is located more in the second frequency band than in the first frequency band;
if none of the detected one or more channels of the first frequency band are adjacent the second frequency band, then adjusting one or more of the transmit filter of the second transceiver and the receive filter of the first transceiver to create a second guard band that is located more in the first frequency band than in the second frequency band,
wherein adjusting one or more of the transmit filter of the second transceiver and the receive filter of the first transceiver to create the first guard band that is located more in the first frequency band than in the second frequency band comprises:
adjusting the receive filter of the first transceiver such that a corner frequency of the receive filter is within the first frequency band at a first spectral distance from the adjacent border of the first frequency band.

11. A controller for operating a communication device that comprises a plurality of transceivers including a first transceiver and a second transceiver, wherein the controller is operatively connected to the plurality of transceivers including the first transceiver and the second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border, the controller comprising:
circuitry configured to operate the first and second transceivers concurrently in a frequency division multiplexing mode of operation wherein interference at the first transceiver caused by transmissions of the second transceiver is mitigated, at least in part, by means of band select filtering;
circuitry configured to detect which one or more channels of the second frequency band are being used by the second transceiver and based on an outcome of the detecting, causing the communication device to perform:
if any of the detected one or more channels of the second frequency band are adjacent the first frequency band, then adjusting one or more of a transmit filter of the second transceiver and a receive filter of the first transceiver to create a first guard band that is located more in the first frequency band than in the second frequency band;
if none of the detected one or more channels of the second frequency band are adjacent the first frequency band, then adjusting one or more of the transmit filter of the second transceiver and the receive filter of the first transceiver to create a second guard band that is located more in the second frequency band than in the first frequency band,
wherein adjusting one or more of the transmit filter of the second transceiver and the receive filter of the first transceiver to create the first guard band that is located more in the first frequency band than in the second frequency band comprises:
adjusting the receive filter of the first transceiver such that a corner frequency of the receive filter is within the first frequency band at a first spectral distance from the adjacent border of the first frequency band.

12. The apparatus of claim 11, wherein adjusting one or more of the transmit filter of the second transceiver and the receive filter of the first transceiver to create the second guard band that is located more in the second frequency band than in the first frequency band comprises:
adjusting the receive filter of the first transceiver such that the corner frequency of the receive filter is less than the first spectral distance from the adjacent border of the first frequency band.

13. The apparatus of claim 12, wherein adjusting one or more of the transmit filter of the second transceiver and the receive filter of the first transceiver to create the second guard band that is located more in the second frequency band than in the first frequency band comprises:

adjusting the transmit filter of the second transceiver such that a corner frequency of the transmit filter is within the second frequency band at a second spectral distance from the adjacent border of the first frequency band, wherein a spectral distance between the corner frequency of the transmit filter of the second transceiver and the corner frequency of the receive filter of the first transceiver is sufficient to create a guard band between the first and second frequency bands.

14. The apparatus of claim 12, wherein adjusting the receive filter of the first transceiver such that the corner frequency of the receive filter is less than the first spectral distance from the adjacent from the adjacent border of the first frequency band comprises:
adjusting the receive filter of the first transceiver such that the corner frequency of the receive filter is located at the adjacent border of the first frequency band.

15. The apparatus of claim 11, comprising:
circuitry configured to respond to any of the detected one or more channels of the second frequency band being adjacent the first frequency band by causing the first transceiver to operate in a way that avoids receiving channels located within the first guard band.

16. The apparatus of claim 11, wherein the first and second frequency bands being adjacent one another means that an adjacent border of the first frequency band is within 20 MHz of an adjacent border of the second frequency band.

17. The apparatus of claim 11, comprising the receive filter, wherein the receive filter is a band selective filter that has a pass band whose bandwidth is narrower than a bandwidth of the first frequency band, and wherein adjusting the receive filter comprises adjusting a frequency location of the receive filter pass band.

18. The apparatus of claim 11, comprising the receive filter, and wherein the receive filter comprises:
a plurality of band selective filters, each passing a different portion of the first frequency band;
a switching arrangement operatively coupled to the plurality of band selective filters to enable only one of the band selective filters to be included within a receive path of the first transceiver.

19. The apparatus of claim 11, comprising the transmit filter, and wherein the transmit filter comprises:
a plurality of band selective filters, each passing a different portion of the second frequency band;
a switching arrangement operatively coupled to the plurality of band selective filters to enable only one of the band selective filters to be included within a transmit path of the second transceiver.

20. A controller for operating a communication device that comprises a plurality of transceivers including a first transceiver and a second transceiver, wherein the controller is operatively connected to the plurality of transceivers including the first transceiver and the second transceiver, wherein the first transceiver receives signals on one or more channels within a first frequency band and the second transceiver transmits signals on one or more channels within a second frequency band, wherein the first and second frequency bands are adjacent one another so that each of the first and second frequency bands has an adjacent border and a nonadjacent border, the controller comprising:
circuitry configured to operate the first and second transceivers concurrently in a frequency division multiplexing mode of operation wherein interference at the first transceiver caused by transmissions of the second transceiver is mitigated, at least in part, by means of band select filtering;
circuitry configured to detect which one or more channels of the first frequency band are being used by the first transceiver and based on an outcome of the detecting, performing:
if any of the detected one or more channels of the first frequency band are adjacent the second frequency band, then adjusting one or more of a transmit filter of the second transceiver and a receive filter of the first transceiver to create a first guard band that is located more in the second frequency band than in the first frequency band;
if none of the detected one or more channels of the first frequency band are adjacent the second frequency band, then adjusting one or more of the transmit filter of the second transceiver and the receive filter of the first transceiver to create a second guard band that is located more in the first frequency band than in the second frequency band,
wherein adjusting one or more of the transmit filter of the second transceiver and the receive filter of the first transceiver to create the first guard band that is located more in the first frequency band than in the second frequency band comprises:
adjusting the receive filter of the first transceiver such that a corner frequency of the receive filter is within the first frequency band at a first spectral distance from the adjacent border of the first frequency band.

* * * * *